(12) United States Patent
Ionescu et al.

(10) Patent No.: US 11,221,852 B2
(45) Date of Patent: Jan. 11, 2022

(54) METHOD FOR DYNAMIC ADAPTATION OF A WORKFLOW OF AN AUTOMATIC SYSTEM

(71) Applicant: Siemens Aktiengesellschaft, Munich (DE)

(72) Inventors: Tudor Ionescu, Vienna (AT); Joachim Fröhlich, Kirchseeon (DE); Stefan Rothbauer, Augsburg (DE)

(73) Assignee: SIEMENS AKTIENGESELLSCHAFT

(*) Notice: Subject to any disclaimer, the term of this patent is extended or adjusted under 35 U.S.C. 154(b) by 67 days.

(21) Appl. No.: 16/691,687

(22) Filed: Nov. 22, 2019

(65) Prior Publication Data

US 2020/0192664 A1 Jun. 18, 2020

(30) Foreign Application Priority Data

Dec. 17, 2018 (EP) .................................. 18212975

(51) Int. Cl.
*G06F 9/30* (2018.01)
*G06F 16/182* (2019.01)
*G06F 16/903* (2019.01)
*G05B 19/042* (2006.01)
*G05B 23/02* (2006.01)
*G06F 9/38* (2018.01)

(52) U.S. Cl.
CPC ....... *G06F 9/3005* (2013.01); *G05B 19/0425* (2013.01); *G05B 23/0229* (2013.01); *G06F 9/3891* (2013.01); *G06F 16/182* (2019.01); *G06F 16/903* (2019.01)

(58) Field of Classification Search
CPC G05B 19/05; G05B 19/0425; G05B 23/0229; G06F 9/3005; G06F 16/182; G06F 9/3891; G06F 16/903
See application file for complete search history.

(56) References Cited

U.S. PATENT DOCUMENTS

| 6,095,674 A * | 8/2000 | Verissimo .......... G05B 19/0426 700/32 |
| 2006/0015600 A1* | 1/2006 | Piper ..................... H04L 67/02 709/223 |

(Continued)

OTHER PUBLICATIONS

European Extended Search Report dated Jun. 21, 2019 for Application No. 18212975.9.

(Continued)

*Primary Examiner* — Mohammad Ali
*Assistant Examiner* — Vincent W Chang
(74) *Attorney, Agent, or Firm* — Schmeiser, Olsen & Watts LLP

(57) ABSTRACT

Provided is a method for dynamic adaption of a workflow, WF, of an automation system, AS, wherein the workflow, WF, includes automated handling functions, AHFs, implementing associated production steps of a production process controlled by a workflow processor, WP, of a machine of the automation system and at least one automated handling function, AHF, shell configured to plug a pluggable automated handling function, pAHF, into the workflow, WF, of the automation system during runtime of the automation system for adaption of the workflow, WF.

12 Claims, 16 Drawing Sheets

(56) References Cited

U.S. PATENT DOCUMENTS

| | | | |
|---|---|---|---|
| 2010/0082133 A1* | 4/2010 | Chouinard | G06F 8/20 700/86 |
| 2013/0131840 A1* | 5/2013 | Govindaraj | G05B 19/41865 700/19 |
| 2016/0239011 A1 | 8/2016 | Lo et al. | |
| 2016/0370784 A1 | 12/2016 | Gruenewald et al. | |
| 2017/0039046 A1 | 2/2017 | Henke et al. | |

OTHER PUBLICATIONS

European Search Report for Application No. 18212975.9, dated Apr. 14, 2021.

\* cited by examiner

Workflow 1:
No stops in M,
N is one AHF ahead

Workflow 2:
No stops in M,
N is several AHFs ahead

Workflow 3:
Stops in M,
N is one AHF behind

Workflow 4:
Stops in M,
N is several AHFs behind

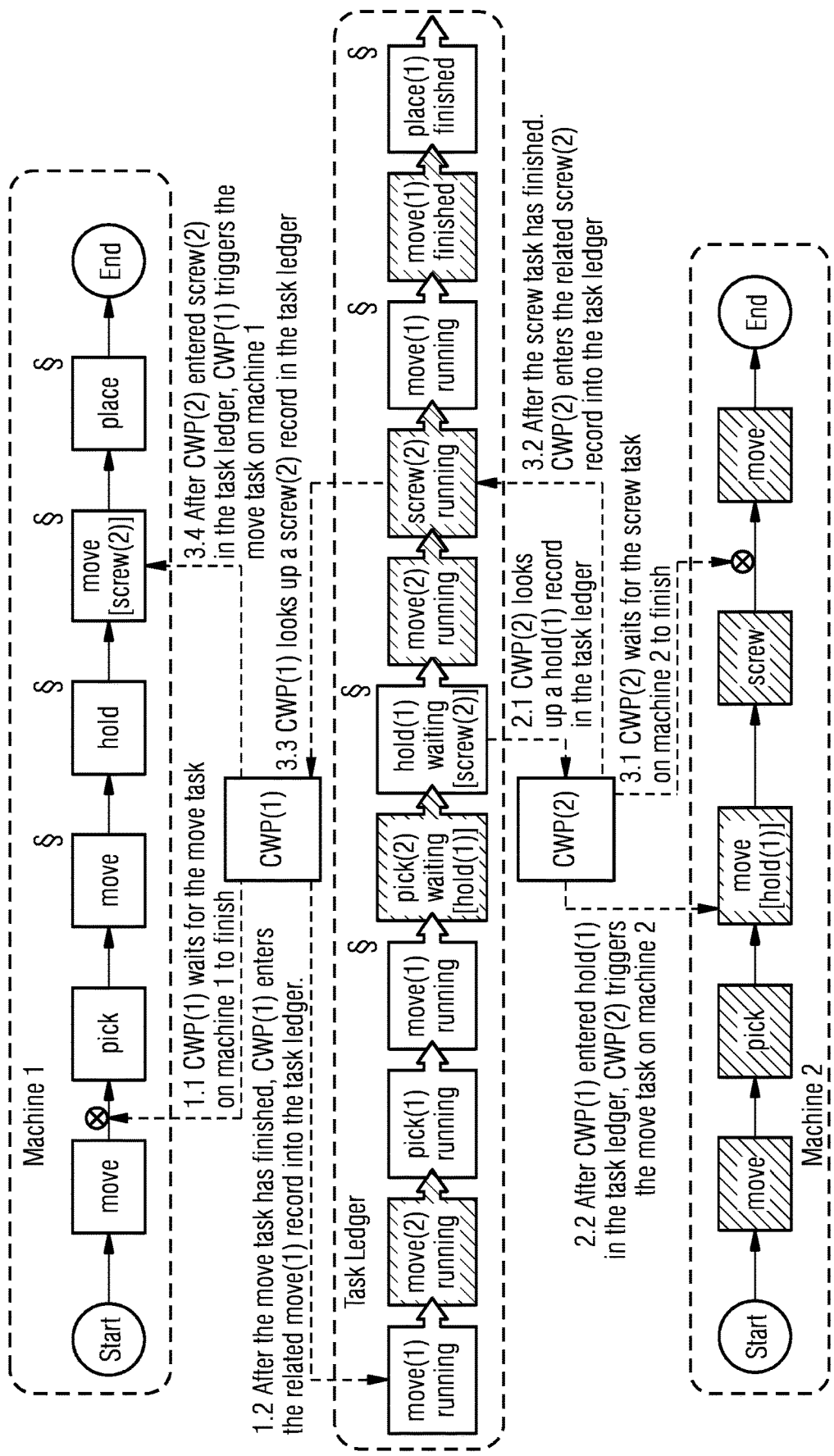

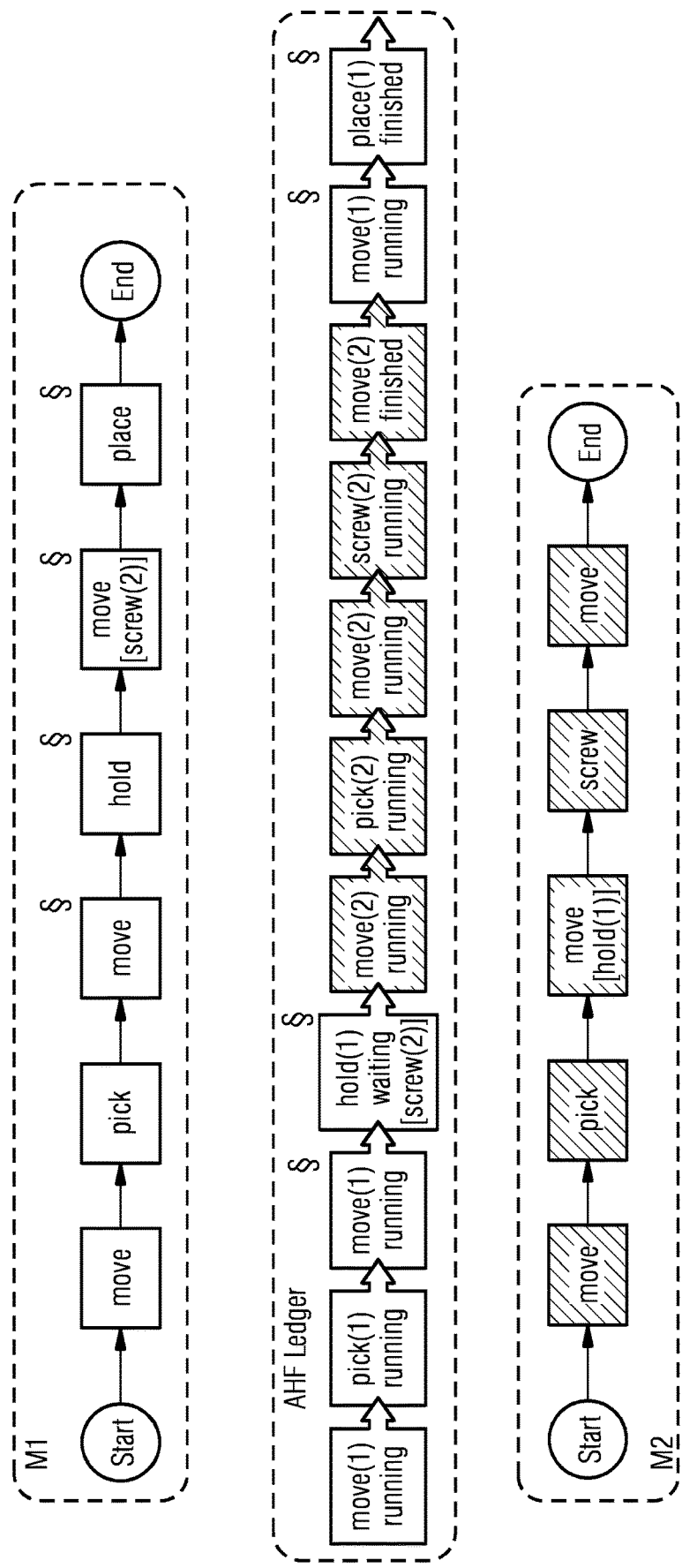

FIG 9

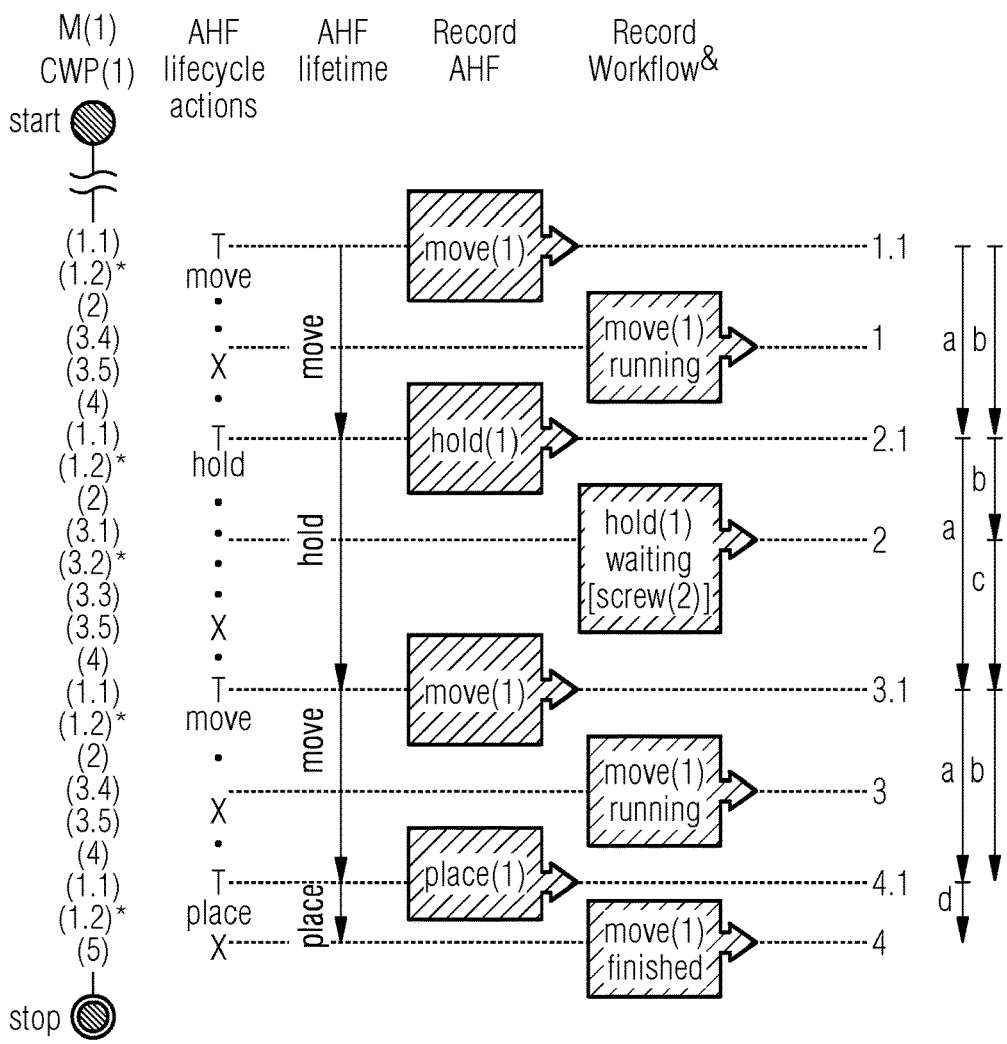

Legend:
- (1.1), (1.2) ... (5) = Refer to actions specified the state machine of Figure 7.
- (1.2)* = Action can be executed once or more than once.
- T = Instantiate AHF.
- X = Release AHF instance.
- Phase a from X.1 to X+1.1 = Period during which a AHF exists, for example for hold(1) from 2.1 to 3.1. In this time a CWP instance covers state 1 and state 2
- Phase b from X.1 to X = AHF executes in normal operation mode. In this time a CWP instance covers state 1.
- Phase c from X to X+1.1 = AHF executes in maintenance mode. In this time a CWP instance covers state 2.
- Phase d from X+1 to X = AHF executes in normal operation mode. In this time a CWP instance covers state 1 in FIG 8 and reaches the stop state.
- &After CWP(1) on machine 1 has entered a workflow record in the AHF ledger, i.e., after having executed one of the mutually exclusive actions (3.1), (3.4), (5) or (6), CWP(2) on collaborating machine 2 can react, if required by a conditioned AHF.

FIG 14
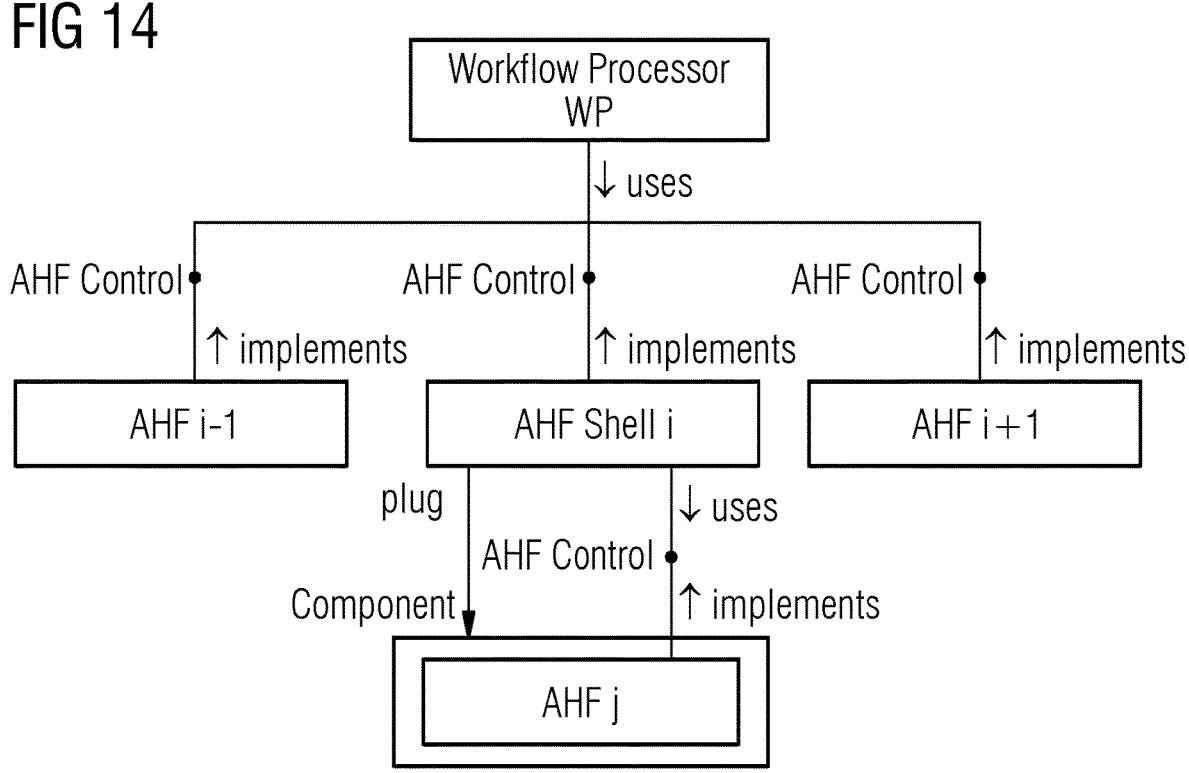
Legend:
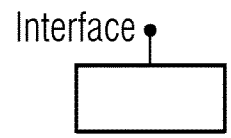 UML like lollipop representation for interfaces
 Component implements and packs a AHF

FIG 16

01: AHFShell.Execute (in:out: ControlToken t)
02: Begin
03:   If (not (null==self.context(plug)))
04:   Begin
05:     Unplug(self.AHF)
06:     self.AHF = Plug(self.context(plug)).
07:     self.AHF.Within(self.context).
08:     self.context(plug) = null.
09:   End.
10:   If (not (null==self.AHF))
11:   Begin
12:     self.AHF.Execute(t).
13:   End.
14: End.

01: AHFShell.Within (in:out: WorkflowExecutionContext c)
02: Begin
03:   self.context = c.
04: End.

METHOD FOR DYNAMIC ADAPTATION OF A WORKFLOW OF AN AUTOMATIC SYSTEM

CROSS-REFERENCE TO RELATED APPLICATIONS

This application claims priority to European Application No. 18212975.9, having a filing date of Dec. 17, 2018, the entire contents of which are hereby incorporated by reference.

FIELD OF TECHNOLOGY

The following relates to a method and a system for controlling a production process performed by machines of an automation system. The automation system can comprise collaborating machines.

BACKGROUND

An automation system can comprise machines adapted to perform production steps of a production process. A production process can be performed by a single machine and/or by collaborating machines which work in parallel to perform the respective production process steps of the production process. Each machine can comprise entities, in particular actuators, performing automated handling functions, AHFs, such as moving, picking or holding mechanical components, in particular workpieces during the production process. Machines of the automation system are designed to perform different kinds of automated handling functions or tasks to the end of fulfilling the production requirements.

In a cyber-physical production system, a high level of human-machine collaboration and/or machine-machine collaboration is required to achieve complex production processes partially also carried out by human workers. However, from an engineering point of view, especially automation systems comprising collaborating machines are difficult to implement. The support of an effective synchronous communication between heterogeneous participants in the collaboration, in particular heterogeneous machines, does increase the complexity of the automation system and increases its failure probability. The probability of failure of the automation system is increased through possible deadlocks and other inter-process communication issues caused by the coordination of the machines. As opposed to purely software-based collaboration protocols, where different software systems interact by exchanging messages, collaboration in a cyber-physical production system requires both message-based but also physical interaction between cyber-physical production units, production machines and/or production robots. The physical interaction can comprise optic, sonic and haptic interaction between collaborating participants, in particular machines and/or humans.

Further, most of the automated handling functions provided by robots or other machines of the automation system need to be preprogrammed. This does limit their collaborative capabilities compared to the capabilities of collaborating human workers. For example, machines or robots lack the intuition, empathy and flexibility of human workers collaborating in a production process. Until now, attempts to equip machines with such anthropological traits have shown only limited success in real production environments.

Further, collaboration protocols between machines of an automation system require some level of standardization which limits their flexibility, ability and effectiveness given that the standardized protocols need to work with a high variety of hardware and software which implicitly reduces their versatility. This poses a great challenge, especially in physical production environments of automation systems which require a high level of standardization.

Accordingly, there is a need to provide a method and a system for efficient and flexible controlling a production process performed by collaborating machines of an automation system.

SUMMARY

An aspect relates to a method for controlling a production process performed by collaborating machines of an automation system according to the first aspect of embodiments of the present invention.

The aspect is also achieved by an automation system comprising collaborating machines to perform a common production process according to a second aspect of embodiments of the present invention.

A conventional automation system is designed to perform a relatively fixed set of preprogrammed automated handling functions or tasks determined as part of its design. A certain degree of flexibility can be achieved by providing means to configure the automation system at runtime. Changing the functionality of the automation system at runtime beyond its configuration space requires re-programming of the automation system. Accordingly, if the requirements of the automation system change beyond its originally intended capabilities, the automation system, notably its software, has to be re-programmed.

There are inherent difficulties to re-program and change an automation system's functionality during operation. Changes to any part of the automation system require the software to be rebuilt and retested even if minor changes are performed. This in return requires a resource- and time-consuming testing and verification effort. In a conventional production setting where each factory or automation system does produce the same product over a long period of time and changes are not frequent this conventional approach is still possible. However, in a more dynamic production scenario common in a smart factory context, the conventional approach is no longer feasible because a bill of process and/or a bill of materials of the products being produced by the automation system are not necessarily known at design time of the system. Moreover, the lot size of such an automation system can be small or even one. A further problem of the conventional approach is that development and development cycles are prolonged because even small changes of individual entities and/or functions in the automation system setting and/or on the real hardware of the automation system cannot be tested easily in the field. In conventional development processes, such as Waterfall, or Agile, tests cannot be performed upon operational software, and even small changes can take a long time to integrate, deploy and test.

Accordingly, it is a further aspect of embodiments of the present invention to provide dynamic adaptability of an automation system.

The embodiments provide according to a further third aspect a method for dynamic adaption of a workflow of an automation system.

The embodiments further provide according to a fourth aspect an automation system adapted (in particular: designed and programmed) to perform a production process according to a workflow which can be adapted dynamically.

The method and system according to embodiments of the present invention increases the flexibility, robustness, safety and efficiency of an automation system performing a production process.

The embodiments provide according to a first aspect a method for controlling a production process performed by collaborating machines of an automation system, wherein each collaborating machine of the automation system comprises an associated workflow execution context of the collaborating machine stored in a local memory of the collaborating machine, wherein the workflow execution context of each collaborating machine includes a workflow of the respective collaborating machine and a precondition context associated with the workflow comprising preconditions for executing automated handling functions by the respective collaborating machine depending on the workflows and automated handling functions of other collaborating machines of the automation system, wherein each collaborating machine of the automation system comprises a collaborative workflow processor having access to a shared database of the automation system to determine workflow states of the collaborating machines, wherein the shared database stores during operation of the automation system metadata about automated handling functions having been executed by the collaborating machines and workflow states of the collaborating machines communicated by the collaborative workflow processors to the shared database of the automation system, wherein a shared sequence of completed automated handling functions and workflow states are processed by the collaborative workflow processors of the collaborating machines of the automation system to coordinate the automated handling functions between the collaborating machines during the production process.

In a possible embodiment of the method for controlling a production process performed by collaborating machines of an automation system according to the first aspect of embodiments of the present invention, the workflow consists of one or more automated handling functions implementing associated production steps of the production process.

In a further possible embodiment of the method for controlling a production process performed by collaborating machines of an automation system according to the first aspect of embodiments of the present invention, the workflow execution context of each collaborating machine stored in the local memory of the collaborating machine contains data items shared between automated handling functions executed by the respective machine.

In a further possible embodiment of the method for controlling a production process performed by collaborating machines of an automation system according to the first aspect of embodiments of the present invention, the shared database of the automation system to which metadata about automated handling functions having been executed by the collaborating machines and workflow states of the collaborating machines are communicated by the collaborative workflow processors during operation of the automation system realizes (or: implements) a distributed ledger (which may also be designated as an AHF ledger) to coordinate the automated handling functions between collaborating machines of the automation system.

In a further possible embodiment of the method for controlling a production process performed by collaborating machines of an automation system according to the first aspect of embodiments of the present invention, the sequence of executed automated handling function instances (i.e. of automated handling function instances having been executed by the collaborating machines) and workflow states of the collaborating machines of the automation system are written into the shared database of the automation system in a secure and immutable way.

In a still further possible embodiment of the method for controlling a production process performed by collaborating machines of an automation system according to the first aspect of embodiments of the present invention, the workflow states recorded in the shared database and used for coordinating the automated handling functions comprise a running state, a waiting state, a finished state and/or an error state.

In a further possible embodiment of the method for controlling a production process performed by collaborating machines of an automation system according to the first aspect of embodiments of the present invention, the shared database of the automation system comprises a central database and/or a distributed database which is accessible to the collaborative workflow processors of the collaborating machines via a communication medium of the automation system.

In a still further possible embodiment of the method for controlling a production process performed by collaborating machines of an automation system according to the first aspect of embodiments of the present invention, the collaborating machines of the automation system comprise machines provided at fixed locations of the automation system and/or mobile machines moveable within the automation system.

In a still further possible embodiment of the method for controlling a production process performed by collaborating machines of an automation system according to the first aspect of embodiments of the present invention, the collaborating machines are at least temporarily collocated to perform automated handling functions on a common production process object.

In a still further possible embodiment of the method for controlling a production process performed by collaborating machines of an automation system according to the first aspect of embodiments of the present invention, the workflow of a collaborating machine comprises a predetermined production workflow loaded into the local memory of the collaborating machine or a workflow generated in a teach-in process and stored in the local memory of the collaborating machine or a workflow generated in a machine learning process and stored in the local memory of the collaborating machine or a workflow provided by a software component delivery pipeline.

In a still further possible embodiment of the method for controlling a production process performed by collaborating machines of an automation system according to the first aspect of embodiments of the present invention, each automated handling function of a workflow of a collaborating machine comprises an automated handling function name or identifier,
a product identifier,
a process identifier,
at least one function parameter and
a machine identifier of the executing collaborating machine.

In a still further possible embodiment of the method for controlling a production process performed by collaborating machines of an automation system according to the first aspect of embodiments of the present invention, the automated handling functions, of a workflow implementing an associated production step of the production process comprise unconditioned automated handling functions executed in series according to the workflow and conditioned automated handling functions executed by a collaborating machine of the automation system depending on results of automated handling functions by other collaborating machines of the automation system.

In a still further possible embodiment of the method for controlling a production process performed by collaborating machines of an automation system according to the first aspect of embodiments of the present invention, a distributed ledger (or: AHF ledger) realized by a central or distributed shared database of the automation system records during operation of the automation system automated handling function attributes and/or process attributes including start and stop time points of automated handling functions, automated handling functions currently executed by a collaborating machine and automated handling function quality indications.

In a still further possible embodiment of the method for controlling a production process performed by collaborating machines of an automation system according to the first aspect of embodiments of the present invention, the recorded automated handling function attributes and/or process attributes are evaluated for performing process analysis and/or process optimization of the production process.

The embodiments further provide according to a further second aspect an automation system comprising collaborating machines adapted to perform a common production process, wherein each collaborating machine comprises a local memory which stores a workflow execution context of the respective collaborating machine comprising a workflow including automated handling functions which implement associated production steps of the production process and a precondition context associated with the workflow for executing automated handling functions by the respective collaborating machine depending on the workflows and automated handling functions of other collaborating machines of the automation system and a collaborative workflow processor having access to a shared database of the automation system to determine workflow states of the collaborating machines, wherein the shared database of the automation system stores during operation of the automation system metadata about automated handling functions having been executed by the collaborating machines of the automation system and workflow states of the collaborating machines of the automation system communicated by the collaborative workflow processors of the collaborating machines to the shared database of the automation system, wherein a sequence of completed automated handling functions and workflow states stored in the shared database of the automation system are processed by the collaborative workflow processors of the collaborating machines of the automation system to coordinate automated handling functions between the collaborating machines during the production process.

The embodiments further provide according to a further third aspect a method for dynamic adaption of a workflow of an automation system, wherein the workflow comprises automated handling functions implementing associated production steps of a production process controlled by a workflow processor of a collaborating machine of the automation system and at least one automated handling function shell configured to plug a pluggable automated handling function into the workflow of the automation system during runtime of the automation system for adaption of the workflow.

In a possible embodiment of the method for dynamic adaption of a workflow of an automation system according to the third aspect of embodiments of the present invention, the plugged-in automated handling function implements at least one associated production step of the production process performed by the at least one collaborating machine of the automation system.

In a further possible embodiment of the method for dynamic adaption of a workflow of an automation system according to the third aspect of embodiments of the present invention, the workflow controlled by the workflow processor of the collaborating machine of the automation system forms part of a workflow execution context associated with the collaborating machine and stored in a memory of the collaborating machine.

In a still further possible embodiment of the method for dynamic adaption of a workflow of an automation system according to the third aspect of embodiments of the present invention, the workflow execution context of the collaborating machine contains data items shared between automated handling functions executed the collaborating machine of the automation system.

In a still further possible embodiment of the method for dynamic adaption of a workflow of an automation system according to the third aspect of embodiments of the present invention, as soon as the pluggable automated handling function has been plugged into the automated handling function shell of the workflow, a control token is passed by the automated handling function shell into the pluggable automated handling function to execute the pluggable automated handling function.

In a still further possible embodiment of the method for dynamic adaption of a workflow of an automation system according to the third aspect of embodiments of the present invention, the pluggable automated handling function is loaded from a repository stored in a database of the automation system or read from a local memory of the collaborating machine of the automation system or read from a portable data carrier connected to the collaborating machine of the automation system or provided by a software component delivery pipeline or by an automated update service.

In a still further possible embodiment of the method for dynamic adaption of a workflow of an automation system according to the third aspect of embodiments of the present invention, the pluggable automated handling function is indicated in a specific data item stored in the workflow execution context of the collaborating machine of the automation system.

In a still further possible embodiment of the method for dynamic adaption of a workflow of an automation system according to the third aspect of embodiments of the present invention, the pluggable automated handling function is adapted to perform a specific automated handling function and/or a specific error handling function.

In a still further possible embodiment of the method for dynamic adaption of a workflow of an automation system according to the third aspect of embodiments of the present invention, if a required pluggable automated handling function indicated in the data item is not available, the automated handling function shell provides a default behavior and/or indicates unavailability of the required pluggable automated handling function.

In a still further possible embodiment of the method for dynamic adaption of a workflow of an automation system according to the third aspect of embodiments of the present invention, the automated handling functions are performed by collaborating machines of the automation system.

In a still further possible embodiment of the method for dynamic adaption of a workflow of an automation system according to the third aspect of embodiments of the present invention, the automated handling functions performed by the collaborating machines of the automation system are coordinated by means of a ledger realized by a shared database of the automation system storing metadata about automated handling functions having been executed by the collaborating machines and workflow states of the collaborating machines of the automation system.

Such metadata about the automated handling function instances having been executed may comprise any or all of the following:
- a name of the automated handling function,
- a state of the automated handling function,
- information about the executing machine of the collaborating machines having executed a particular automated handling function,
- a time when executing of the automated handling function started,
- a time when executing of the automated handling function finished,
- and/or the like.

In a still further possible embodiment of the method for dynamic adaption of a workflow of an automation system according to the third aspect of embodiments of the present invention, each automated handling function of the workflow comprises at least one input port and at least one output port to send and receive a control token between the automated handling functions.

In a still further possible embodiment of the method for dynamic adaption of a workflow of an automation system according to the third aspect of embodiments of the present invention, the execution of an automated handling function is started automatically in response to reception of the control token via one of its input ports.

In a still further possible embodiment of the method for dynamic adaption of a workflow of an automation system according to the third aspect of embodiments of the present invention, after completed execution of an automated handling function, the control token passes via the output port of the automated handling function to an input port of the next automated handling function within the workflow to be executed.

In a still further possible embodiment of the method for dynamic adaption of a workflow of an automation system according to the third aspect of embodiments of the present invention, the control token is used for controlling the workflow execution and/or for controlling the application of an error handling policy if an error occurs during execution of an automated handling function.

The embodiments further provide according to a fourth aspect an automation system comprising a machine to perform a production process according to a workflow comprising automated handling functions implementing associated production steps of the production process and executed by a workflow processor of the machine,
wherein the workflow comprises at least one automated handling function shell configured to plug a pluggable automated handling function into the workflow of the automation system during runtime of the automation system to adapt dynamically the workflow of the automation system.

BRIEF DESCRIPTION

Some of the embodiments will be described in detail, with reference to the following figures, wherein like designations denote like members, wherein:

FIG. 6 shows an example of a concrete workflow history of automated handling functions;

FIG. 7 shows an example of a specific workflow coordinated by an AHF ledger;

FIG. 9 shows an exemplary collaborative workflow processor executing workflow on a machine;

FIG. 14 illustrates an AHF shell in a workflow context;

FIG. 16 illustrates AHF shell semantics;

DETAILED DESCRIPTION

Figure 1:
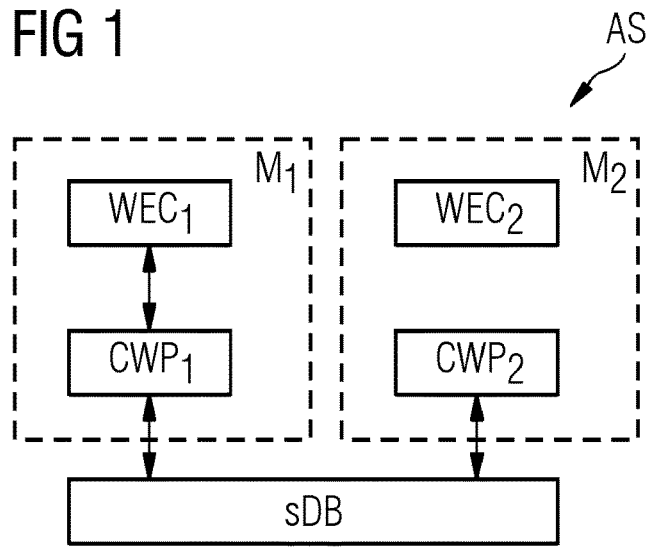
FIG. 1 shows a schematic diagram for illustrating the operation of a possible exemplary embodiment of a method and system for controlling a production process performed by collaborating machines of an automation system according to the first aspect of embodiments of the present invention.

As can be seen in the schematic diagram of FIG. 1, an automation system AS can comprise one or more collaborating machines M. The collaborating machines M can for instance comprise production machines adapted to perform production steps of a production process. In the illustrated embodiment of FIG. 1, each machine collaborating M of the automation system AS comprises an associated workflow execution context WEC of the respective collaborating machine M which can be stored in a local memory of the collaborating machine M.

The workflow execution context WEC of each collaborating machine M includes a workflow WF of the respective machine M and comprises a precondition context associated with the workflow WF. The precondition context comprises preconditions for executing automated handling functions AHFs by the respective collaborating machine M depending on the workflows WFs and automated handling functions AHFs of other collaborating machines of the automation system AS. In the illustrated embodiment, the automation system AS comprises two machines collaborating M1, M2 each comprising a memory for storing an associated workflow execution context WEC1, WEC2. Both collaborating machines M1, M2 of the automation system AS are configured to collaborate in a production process.

As illustrated in FIG. 1, each collaborating machine M of the automation system AS comprises a collaborative workflow processor CWP having access to a shared database SDB of the automation system AS to determine workflow states s of the collaborating machines M. The shared database SDB of the automation system AS stores during operation of the automation system AS metadata about automated handling functions and/or sequence of automated handling function, AHF, instances having been executed by the collaborating machines M and workflow states s of the collaborating machines.

A sequence of automated handling function, AHF, instances and/or metadata about automated handling functions having been executed by the collaborating machines M as well as the workflow states s of the collaborating machines M are communicated by the collaborative workflow processors CWPs to the shared database SDB of the automation system AS via a communication medium.

The shared sequence of completed automated handling function, AHF, instances and workflow states s can be processed by the collaborative workflow processors CWPs of the collaborating machines of the automation system AS to coordinate the automated handling functions AHFs between the collaborating machines M during the production process. A workflow WF executed by a collaborating machine M of the automation system AS can consist of one or more automated handling functions AHFs implementing associated production steps of the respective production process. These automated handling functions AHFs can comprise for instance a moving, picking or holding of workpieces during the production process such as an assembly process.

The automated handling functions AHFs can comprise any kind of movement of workpieces and/or tools such as lateral movement or rotational movement performed by an actuator of the machine M. An automated handling function AHF can also comprise functions performed by the collaborating machine M for processing a workpiece, in particular processing the surface of the workpiece. An automated handling function can for instance be performed by an actuator of the collaborating machine to remove or add material to a workpiece or to manipulate its environment.

Moreover, an automated handling function AHF can also comprise a treatment of a workpiece to change its physical, chemical and/or biological characteristics. The automated handling function AHF can comprise different kinds of physical interaction between entities of the collaborating machine M, in particular its actuators, including optic, sonic and haptic interaction between the collaborating machines M and workpieces or objects processed during the production process.

In the illustrated exemplary embodiment of FIG. 1, each collaborating machine M comprises an associated workflow execution context WEC stored in a memory of the machine M. The workflow execution context WEC includes a workflow WF (see FIG. 2) of the respective collaborating machine M and a precondition context associated with the respective workflow WF. The workflow execution context WEC of each collaborating machine stored in the local memory of the collaborating machine contains in a possible embodiment data items shared between automated handling functions AHFs executed physically by entities (e.g. actuators) of the respective collaborating machine.

In a possible embodiment, the sequence of automated handling functions, AHF, instances having been executed by the collaborating machines M and/or metadata about automated handling functions and the workflow states s of the collaborating machines M can be communicated by the collaborative workflow processors CWPs during operation of the automation system AS to the shared database SDB of the automation system AS which realizes a distributed ledger (or: AHF ledger) to coordinate, or to facilitate the coordination of, the automated handling functions AHFs between collaborating machines M of the automation system AS.

In a preferred embodiment, the sequence of completed automated handling function AHF instances and workflow states s of the collaborating machines M of the automation system AS are written in a secure and immutable way into the shared database SDB of the automation system AS. Workflow states s as recorded in the shared database SDB and used for coordinating the automated handling functions AHF comprise in a possible embodiment a running state, a waiting state, a finished state and/or an error state of the collaborating machine.

The shared database SDB of the automation system AS can comprise in a possible embodiment a central database. In a further possible embodiment, the shared database SDB of the automation system AS can also comprise a distributed database which communicates with the collaborative workflow processors CWPs of the collaborating machines M via a communication medium of the automation system AS.

The collaborating machines M of the automation system AS can comprise machines provided at fixed locations of the automation system AS such as an assembly line. The collaborating machines M of the automation system AS can also comprise movable machines in the automation system AS. For instance, the automation system AS can comprise robots moving on a shop floor of a production facility to move parts between other machines M performing production processes on the moved workpieces or intermediary products. Collaborating machines M1, M2 of the automation system AS as illustrated in the exemplary embodiment of FIG. 1 are at least temporarily collocated to perform automated handling functions on a common production process object such as a physical workpiece.

The workflow WF of a collaborating machine M can comprise a predetermined production workflow which can be loaded into the local memory of the collaborating machine M. In a further possible embodiment, the workflow WF can also be generated in a teach-in process installed in the local memory of the collaborating machine M. In a still further possible embodiment, the workflow WF can also be generated in a machine-learning process installed in the local memory of the collaborating machine M. In a still further possible embodiment, the workflow WF of a collaborating machine M can be provided by a software component delivery pipeline of the automation system AS.

In a possible embodiment, each automated handling function AHF of a workflow WF of a collaborating machine M can comprise an automated handling function name or identifier. The automated handling function AHF of a workflow WF can further comprise a product and/or a process identifier which can be used to identify the production process object and/or the production process comprising several production process steps. In a still further possible embodiment, each automated handling function AHF further comprises a machine identifier of the collaborating machine M executing the respective automated handling function AHF.

The automated handling functions AHFs of a workflow WF implementing associated production step of a production process comprises in a possible embodiment unconditioned automated handling functions AHFs which are executed in series according to the workflow WF. The automated handling functions AHFs of the workflow WF can also comprise conditioned automated handling functions AHFs executed by a collaborating machine M of the automation system AS depending on results of automated handling functions AHFs by other collaborating machines M of the automation system AS.

In a possible embodiment, the shared database SDB of the automation system AS is configured to realize a ledger used for coordination of collaborating machines M of the automation system AS. The ledger realized by the shared database SDB of the automation system AS records during operation of the automation system AS automated handling function AHF attributes and/or process attributes including start and stop time points of automated handling functions AHFs, automated handling functions AHFs currently executed by a collaborating machine M as well as automated handling function AHF quality indications. The recorded automated handling function AHF attributes and/or process attributes can be evaluated in a possible embodiment for performing process analysis and/or process optimization of the production process.

In the illustrated exemplary embodiment of FIG. 1, the automation system AS comprises two collaborating machines M1, M2 collaborating to perform a production process. The number of collaborating machines M implemented in the automation system AS can vary depending on the use case.

In a possible embodiment, the automation system AS can comprise a plurality of different collaborating machines $M_i$ collaborating to perform production process steps of a production process. The collaborating machines M can comprise machines located at fixed positions but also adapted to move around in an automation system area. The collaborating machines M can be partially collocated to collaborate on common production process objects during production steps.

Each collaborating machine M can consist of a plurality of entities and/or subsystems. The entities can comprise actuators, sensors and/or processing units. The processing entities of the collaborating machine can have access to the local memory of the collaborating machine M where a workflow execution context WEC of the respective collaborating machine is stored.

Figure 2:
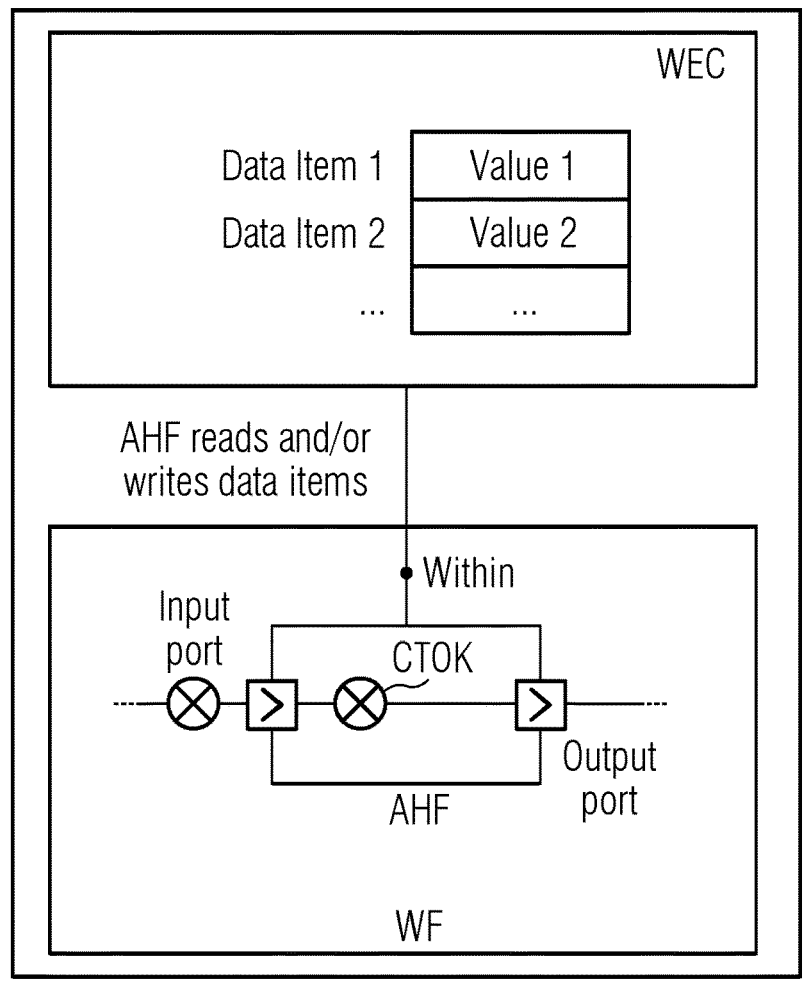
FIG. 2 illustrates an automated handling function AHF implementing a production step of a production process.

As also illustrated in FIG. 2, the workflow execution context WEC of each collaborating machine M can contain data items which can be shared between automated handling functions AHFs executed the respective collaborating machine. The collaborating machine M can comprise a production machine, a robot or any other type of a production unit adapted to perform software-controlled production steps.

For example, a collaborating machine M can assemble various parts of a product and can change properties of components, e.g. by grinding, drilling, swaging and/or cutting. Other collaborating machines M of the automation system AS can for instance transform raw materials to unfinished intermediate parts for further processing. The workflow execution context WEC comprises preconditions for executing automated handling functions AHFs by the respective collaborating machine M depending on the workflows WFs and automated handling functions AHFs of other collaborating machines M of the same automation system AS, in particular depending on the workflow states, s, of the collaborating machines, M.

An automated handling function AHF or task can implement a production step of the production process as also illustrated in FIG. 2. A currently executing automated handling function AHF (also may be referred to as task) can read and write data items in the workflow execution context WEC stored in the local memory of the collaborating machine M. In a possible embodiment, the currently executing task or automated handling function AHF is the automated handling function AHF that temporarily possesses a control token CTOK as also illustrated in FIG. 2. Only one automated handling function AHF can own the control token CTOK at any particular time. During each change between two automated handling functions AHFs, the task environment must own the control token CTOK.

Figure 15:
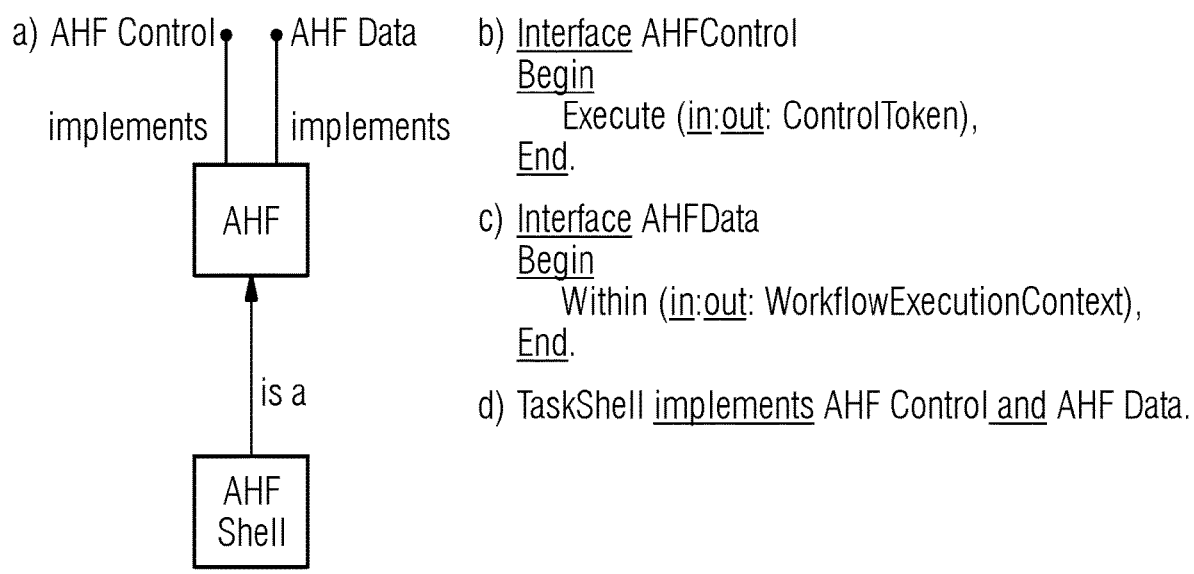
FIG. 15 illustrates an AHF shell implementing interfaces for organizing a control flow and dataflow.

An AHF (or: task) interface may e.g. be defined as shown in FIG. 15.

The execution of a workflow WF comprising several automated handling functions AHFs requires a control flow mechanism to be in place. In this case, an automated handling function AHF starts execution when it obtains a control token from the previous automated handling function AHF or from a control token CTOK source.

$$WF=start\ AHF>>AHF>>AHF \qquad \{1\}$$

The automated handling function AHF is executed by a processing unit or a processor of the collaborating machine M while it does possess the control token CTOK. During execution, an automated handling function AHF can read and write data items contained in a common memory area referred to as the workflow execution context WEC. Automated handling functions AHFs can use the workflow execution context WEC for storing workflow-internal data items shared by and/or flowing between automated handling functions AHFs of the same workflow WF.

Additionally, an automated handling function AHF can use the workflow execution context WEC for storing AHF internal data items. In particular, an automated handling function AHF may perform a read/write operation for AHF internal data items on the workflow execution context WEC while it possesses the control token CTOK. While all automated handling functions AHFs of a workflow WF can share a common workflow execution context WEC, only the currently executing automated handling function AHF can access the workflow execution context WEC. The currently executing automated handling function AHF is the automated handling function AHF which does possess the control token CTOK at any particular time.

Figure 3:
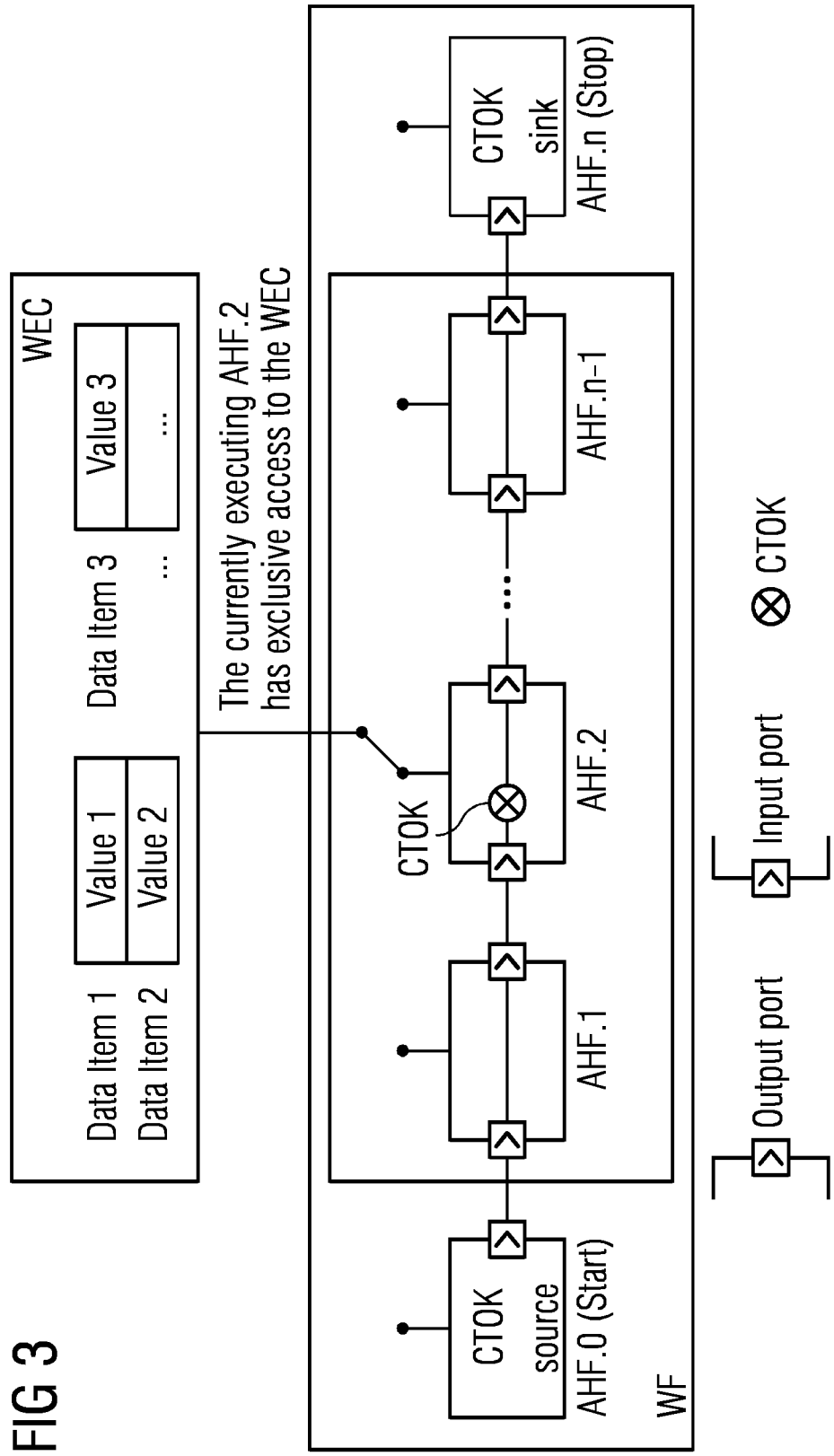
FIG. 3 shows a workflow composed of several automated handling functions enclosed by a start AHF and a stop AHF.

FIG. 3 shows a workflow WF composed of automated handling functions AHFs enclosed by a start AHF and a stop AHF. In the illustrated embodiment of FIG. 3, the currently executed automated handling function AHF2 has exclusive access to the workflow execution context WEC stored in the memory of the collaborating machine M. The workflow execution context WEC stores different data items DI which can have different values V. The workflow WF is composed in the illustrated example as a series of automated handling functions AHFs. In the example illustrated in FIG. 3, automated handling functions AHFs execute successively within a concrete workflow WF when the collaborating machine M operates and a control token CTOK flows through the automated handling functions AHFs. For example, the automated handling functions AHFs of a transport workflow may be sequenced as follows:

transport=move>>pick>>move>>place>>release {2}

In a workflow WF, a collaborating machine M can apply or execute a skill, i.e. when a control token CTOK flows through the instances of the workflow's automated handling functions AHFs. In a possible embodiment, a special start AHF (source) does emit a control token CTOK per workflow WF and a special stop AHF (sink) can collect the control tokens CTOK, for example start AHF>>transport>>stop AHF {3}

Start and stop AHFs can bind skills and enable the exchange of automated handling functions AHFs and skills. In complex, nested descriptions, the start and stop AHF can represent the tasks or AHFs in a nesting skill that bind a nested (plugged) skill or automated handling function AHF. In the example illustrated in FIG. 3, the transport automated handling function AHF can be considered to be monolithic and may be replaced by a sequence of automated handling functions AHFs as follows:

start AHF>>move>>pick>> . . . >>release>>stop AHF {4}

In a possible embodiment, each automated handling function AHF such as a move automated handling function AHF can be implemented as a self-contained, binary function component. A function component can be used to create instances of an automated handling function AHF. An automated handling function AHF operates within the workflow execution context WEC of exactly one executing workflow of the collaborating machine M. In a possible embodiment, the following attributes can identify an automated handling function AHF instance:

an automated handling function name or identifier,
a product identifier,
a process identifier,
at least one function parameter, and
a machine identifier of the executing machine.

The identified automated handling functions AHFs can formally be described as follows:

AHFname.AHFidentifier<product_identifier,AHF_parameter, . . . >(machine_identifier) {5}

An example for a fully identified AHF instance is:

pick.8<screw-top jar,jar>(2) {6}

In this example, a screw-top jar shall be assembled. It can be assumed here that the product "screw-top jar" is identified by its name. The automated handling function AHF is to pick a jar, identified by its name. The or AHF identifier is in this example 8. The AHF identifier distinguishes instances of the same automated handling function AHF. Within the specification of a collaborative workflow WF, it is necessary to identify automated handling functions AHFs by AHF identifiers if the collaborating machines M coordinate their respective roles by distinguished automated handling functions AHFs of the same type.

In general, each automated handling function AHF instance can comprise an instance of an input port as well as an instance of an output port as also illustrated in FIG. 2. Exceptions are instances of the start AHF and the stop AHF. The top-level start AHF emits control tokens CTOK. The top-level stop AHF collects control tokens CTOK after workflow execution, i.e. after the workflow WF has been finished. Hence, the start AHF of the top-level skill has only one output port and the stop AHF of the top-level skill has only one input port.

In the following, skills, AHFs and ports are described where instances of skills, AHFs and ports are meant.

Ports of automated handling functions AHFs can fulfill different purposes:

Ports define interfaces between automated handling functions AHFs and can be used to transport control tokens CTOK between the automated handling functions AHF. The control token CTOK received at the input port of an automated handling function AHF does start the execution of the respective automated handling function AHF. The control token CTOK output at the output port of an automated handling function AHF does signal the end of the execution of the respective automated handling function AHF. The output control token CTOK does pass to the next automated handling function AHF within the workflow WF.

With a collaborative workflow of a collaborating machine M, a complex, software-technical function comprising several automated handling functions AHFs executed by collocated collaborated machines M or by collaborating machine entities is denoted.

A collaborating machine M can comprise entities such as sensors, actuators and/or data processing units. A collaborating machine M can comprise a robot having one or more robot arms operating as actuators. The different entities of a machine M can be collocated to work on a common production process object such as a workpiece. Entities (e.g. sensors, actuators or other components) of the collaborating machine M, in particular actuators, can be controlled by a controller or control unit of the collaborating machine M.

In a possible embodiment, a collaborating machine M has a collaborative workflow processor CWP having access to the shared database SDB of the automation system AS to determine current workflow states s. A collaborative workflow processor CWP of a collaborating machine M can control one or more entities, in particular actuators of the respective collaborating machine M during a production process step.

In a possible embodiment, different collaborating machines and/or machine entities jointly execute a production step comprising several automated handling functions AHF. Both collaborating machines M as illustrated in the embodiment of FIG. 1 can use the same definition of a collaborative workflow WF. A collaborative workflow WF can be defined as a sequence of automated handling functions AHFs as follows:

WF=AHF[predecessor AHF]>>AHF[predecessor AHF]>> {7}

The automated handling function AHF can be executed by a processor, in particular a collaborative workflow processor CWP implemented in the collaborating machine M. The two different collaborating machines M and N collaborate with each other, AHF.1(M) executing on collaborating machine M can depend on results of AHF(N) executing on the other collaborating machine N. The predecessor AHF(N) must have been completed before collaborating machine M can continue with starting and executing the next AHF which is AHF.2(M):

AHF.1(M)>>AHF.2(M)[AHF(N)] {8}

AHF.2(M) is a conditioned AHF and AHF(N) is an AHF condition.

Figure 4:
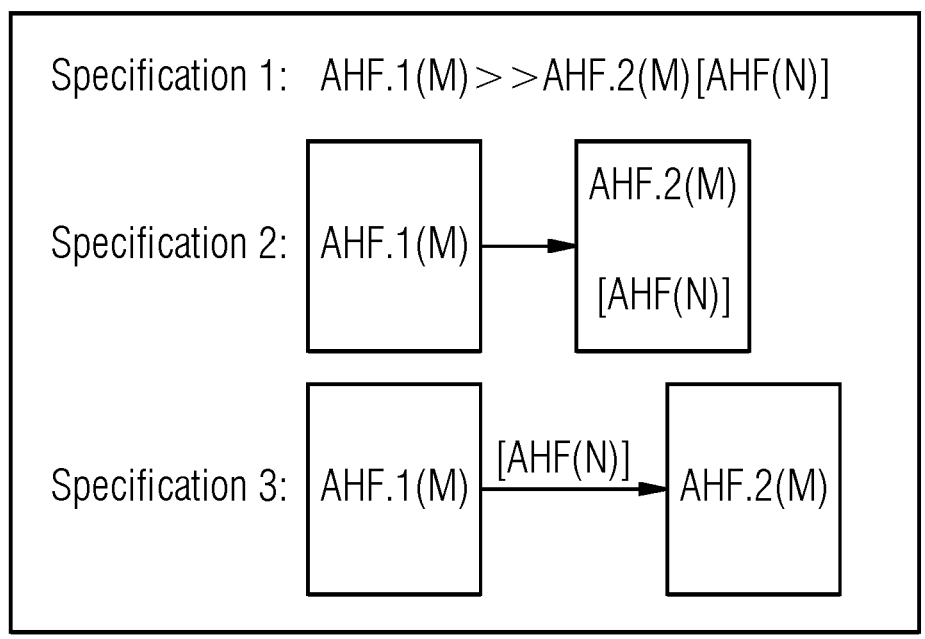
FIG. 4 illustrates equivalent representations of specifications of a conditioned automated handling function AHF.
Figure 5A:
FIG. 5a illustrates a first successful workflow for the conditioned automated handling function AHF specified in FIG. 4.
Figure 5B:
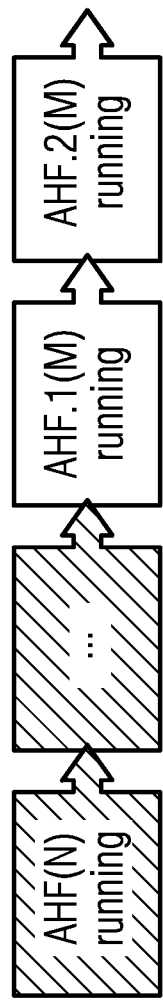
FIG. 5b illustrates a second successful workflow for the conditioned automated handling function AHF specified in FIG. 4.
Figure 5C:
FIG. 5c illustrates a third successful workflow for the conditioned automated handling function AHF specified in FIG. 4.
Figure 5D:
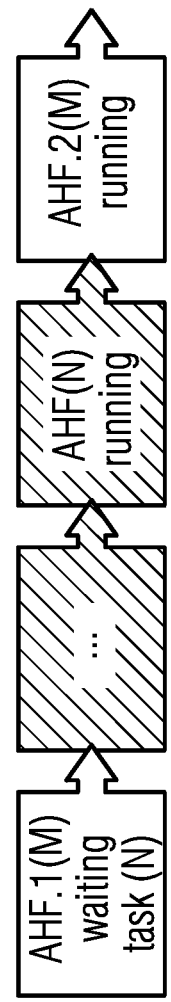
FIG. 5d illustrates a fourth successful workflow for the conditioned automated handling function AHF specified in FIG. 4.

FIG. 4 illustrates several equivalent representations of a conditioned AHF and can lead to different workflows WF as illustrated in FIGS. 5*a*, 5*b*, 5*c* and 5*d*.

FIGS. 5*a*, 5*b*, 5*c* and 5*d* shows different successfully executed workflows WFs for AHF.1(M)>>AHF.2(M) [AHF (N)]. It is of note that each workflow WF can provide a different interleaving of AHF instances for the same workflow description, provided that it also contains unconditioned AHFs.

In cases of production scenarios where more than two collaborating machines M collaborate with each other, a conditioned AHF on a collaborating machine M can actually require completing one or more automated handling functions AHFs on other collaborating machines $N_i$. In such cases, AHF conditions (predecessor AHFs executed by another collaborating machine M) can be combined as illustrated in the following example where an automated handling function AHF on collaborating machine M depends on the completion of two automated handling functions AHFs on collaborating machines N1 and N2:

$$\text{AHF}(M)[\text{AHF}(N_1) \text{ and } \text{AHF}(N_2)] \qquad \{9\}$$

Generally, automated handling function AHF conditions (predecessor AHFs) can be specified in logical expressions consisting of logical operators such as "and" or "and not" applied to atomic operands or structured operands.

In the following, an example of a correctly specified collaborative workflow WF for a collaborating machine M1 collaborating with collaborating machine M2 is given. For the specification of automated handling functions AHFs, one can use as AHF names the machine identifiers (1 and 2) because they suffice for disambiguation.

$$\begin{aligned}\text{WF} = &\text{move}(1)\!>\!>\!\text{pick}(1)\!>\!>\!\text{move}(1)\!>\!>\!\text{hold}(1)\!>\!>\!\text{move}\\&(2)\!>\!>\!\text{pick}(2)\!>\!>\!\text{move}(2)[\text{hold}(1)]\!>\!>\!\text{screw}(2)\\&\!>\!>\!\text{move}(2)\!>\!>\!\text{move}(1)[\text{screw}(2)]\!>\!>\!\text{place}(1)\end{aligned} \qquad \{10a\}$$

Upon initializing and starting this collaborative workflow WF, the AHF sequence scheduled for the collaborating machine M1 is:

$$\begin{aligned}\text{WF}(1) = &\text{move}(1)\!>\!>\!\text{pick}(1)\!>\!>\!\text{move}(1)\!>\!>\!\text{hold}(1)\\&\!>\!>\!\text{move}(1)[\text{screw}(2)]\!>\!>\!\text{place}(1)\end{aligned} \qquad \{10b\}$$

The AHF sequence scheduled for the collaborating machine M2 is:

$$\begin{aligned}\text{WF}(2) = &\text{move}(2)\!>\!>\!\text{pick}(2)\!>\!>\!\text{move}(2)[\text{hold}(1)]\\&\!>\!>\!\text{screw}(2)\!>\!>\!\text{move}(2)\end{aligned} \qquad \{10c\}$$

It is of note that machine-specific production workflows WFs, that is WF(1) and WF(2), can use separate workflow execution contexts WECs, that is WEC1 and WEC2, respectively, for executing machine-specific automated handling functions AHFs.

The combined execution of the automated handling function AHF sequence of machine M1 and M2 can lead to different concrete workflows WF of AHFs depending on possibly varying properties of the production environment of the product and/or of the collaborating production machines M.

FIG. 6 shows an example of a concrete workflow WF history of automated handling functions AHFs resulting from the execution of {10a}, i.e. from the parallel execution of {10b} and {10c}.

FIG. 6 illustrates the successful collaboration of two collaborating machines M resulting from the executions of the workflows WFs.

As can be seen, on the collaborating machine M1, the AHF move(1)[screw(2)] is a conditioned automated handling function AHF. That is, AHF screw(2) executed on collaborating machine M2 must have been completed before AHF move(1) can be executed on collaborating machine M1. On collaborating machine M2, the AHF move(2)[hold (1)] is also conditioned. That is, AHF move(2) must wait for the completion of the AHF hold(1) executed on the collaborating machine M1.

Execution of a collaborative workflow WF can be performed by individual collaborative workflow processors CWPs of the collaborating machines. In a possible embodiment, both collaborating machines M1, M2 can comprise separate collaborative workflow processor CWP instances. For AHF coordination, the collaborative workflow processor CWP instances of both collaborating machines M1, M2 can use a shared database SDB of historical data which realizes, or may be interpreted as, a distributed ledger.

At any point during operation, the AHF ledger can document completed automated handling functions AHFs and workflow states s of the collaborating machines M of the automation system AS. Necessary data for coordinating automated handling functions AHFs between collaborating machines M can comprise the completed automated handling function AHF including the product in development or the process followed. Other necessary data comprises the collaborating machine M that has executed the respective automated handling function AHF. Further data used for coordinating the AHF between the collaborating machines M can comprise the state of the workflow WF when the collaborating machine M, i.e. its collaborative workflow processor CWP, attempted to continue with the next automated handling function AHF.

On attempting to perform a transition from a completed AHF instance to the next AHF instance, the workflow WF can pass through or be in one of the following workflow states s relevant for coordination and hence also recorded in the AHF ledger of the automation system AS.

The workflow states s as recorded in the ledger and used for coordinating the automated handling functions AHFs can comprise in a possible embodiment a running state, a waiting state, a finished state and/or an error state.

In the running state, the workflow WF continues without interruption with the next AHF either because the next AHF is not conditioned (default AHF condition is true) or because the AHF condition of the next, conditioned AHF has already been fulfilled.

In the waiting state, the next AHF of the workflow WF is a conditioned AHF and the condition is not yet fulfilled. A predecessor AHF on the collaborating machine M either has not started yet or is still running.

In the finished state, all AHFs comprised by workflow WF have been executed successfully and have reached their finished state.

In the error state, an AHF of a workflow WF could not be completed and stopped with an error.

FIG. 7 shows an example of a correct workflow WF that can result from the specification of a collaborative skill or workflow WF. Logically, this workflow WF runs exactly as specified above.

In a possible embodiment, besides the data mentioned above, the AHF ledger can record more AHF/process attributes. These attributes can comprise time points when AHFs start and stop execution. Further, they can comprise the currently running AHF and its operation mode, e.g. a normal operation mode and/or a maintenance (i.e. error handling) operation mode. The attributes can also comprise AHF quality indicators such as overshoots and oscillation of output signals before converging to a reference input or a number of retries.

These additional data or attributes stored in the AHF ledger can be processed for analyzing purposes. The data stored in the ledger can be read by a local or remote processor performing an evaluation algorithm to analyze the data. For instance, the processor can perform a quality analysis and even provide an optimization of the production process.

With additional task/process attributes, more complex workflows WFs can be specified and used as more powerful specifications of AHF conditions (predecessor AHFs).

The AHF ledger comprises in a possible embodiment data that enables collaborating machines M of the automation system AS to coordinate their automated handling functions AHFs when necessary. Internal data of an AHF instance or data-specific to the internals of a workflow WF of automated handling functions AHFs on one of the collaborating machines M of the automation system AS can be kept in a machine-specific workflow execution context WEC. Sensor-guided AHFs can generate and use during AHF executions internal data when processing signals and events in order to control an entity, in particular an actuator of the collaborating machine M.

A conditioned automated handling function AHF executed on a collaborating machine M, i.e. AHF(M)[AHF(N)] comprises at least one predecessor AHF(N) executing on another collaborating machine N. In this case, the collaborative workflow processor CWP instance executed on collaborating machine M (CWP(M)) does check whether the common AHF ledger stored in the shared database SDB already contains a record for AHF(N) that does report a successful AHF completion. If the AHF ledger contains such a record, i.e. if the AHF condition is fulfilled, then the collaborative workflow processor CWP(M) can start with the conditioned AHF. Otherwise, the collaborative workflow processor CWP(M) will wait for the conditions of the next AHF to become true.

Figure 8:
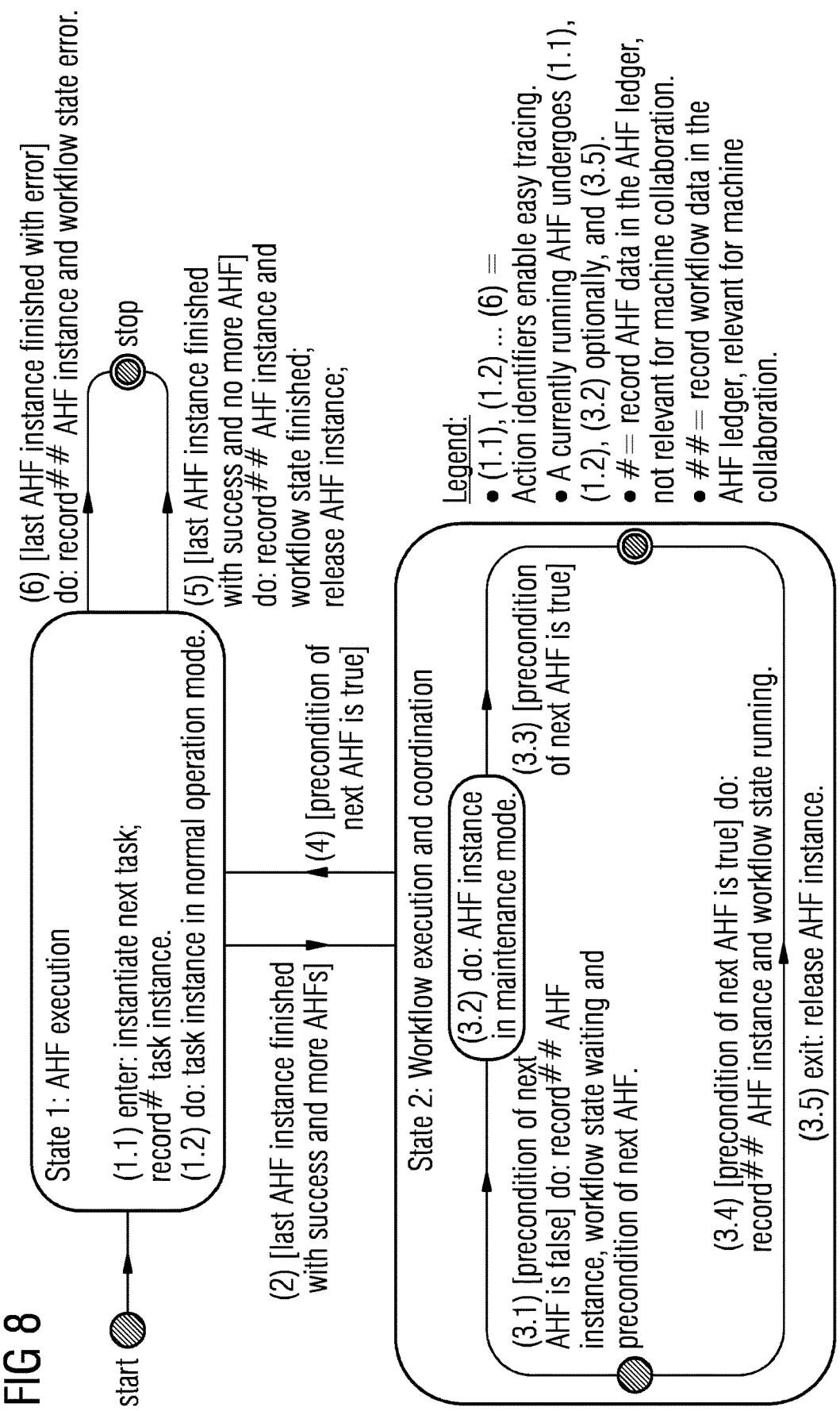
FIG. 8 illustrates the behavior of a collaborative workflow processor specified as a state machine.

While waiting for the completion of the predecessor AHF(N) on the collaborating machines, the currently executing AHF runs no longer in a normal operation mode but in a waiting mode. This enables the currently executing AHF to continue controlling the system and/or process or parts of the collaborating machine M, e.g. in order to keep the system stable until the predecessor AHF has been completed and the workflow WF can continue with the next automated handling function AHF. FIG. 8 specifies the operation behavior of such a collaborative workflow processor CWP.

In the illustrated exemplary embodiment, the collaborative workflow processor CWP of a collaborating machine M collaborating with another collaborating machine M can comprise two states, i.e. a state where an automated handling function AHF is executed and a state for workflow execution and coordination. In the embodiment illustrated in FIG. 8, the operation behavior of the collaborative workflow processor CWP is specified as a state machine in a unified modeling language (UML) notation.

An AHF instance is considered to be completed only after it has left the normal operation mode (action 1.2) in the CWP state machine shown in FIG. 8. This enables collaboration scenarios with overlapping automated handling functions AHFs.

With the state machine illustrated in FIG. 8, the workflows WFs of automated handling functions AHFs in FIGS. 6, 7 can be explained as also illustrated in FIG. 9.

FIG. 9 illustrates that the collaborative workflow processor CWP(1) executes {10b} on the collaborating machine M1.

FIG. 9 shows a sequence of operation states of the collaborative workflow processor CWP(1) between start and stop as well as associated AHF lifecycle actions or AHF lifetime and the recording of the automated handling functions AHFs within the AHF ledger of the system.

The sequence of automated handling functions AHFs executed on one collaborating machine M is totally ordered. The ordering can be given in the workflow specification which is subject to the constraints and the leeway that the production process of a specific product with partially parallel sub-processes defines. The sequence of automated handling functions AHFs in the AHF ledger is partially ordered by the collaborating machines M that execute these automated handling functions AHFs. In consequence, different workflows WFs for the same collaborative workflow WF can result.

The ordering between automated handling functions AHFs executed on the same collaborating machine M is unchanged and the ordering between automated handling functions AHFs that are executed on different collaborating machines M is given by the AHF conditions (predecessor AHFs). Consequently, for example, in FIG. 10, the workflow parts 1 to 3 form alternatives to each other.

Figure 10:
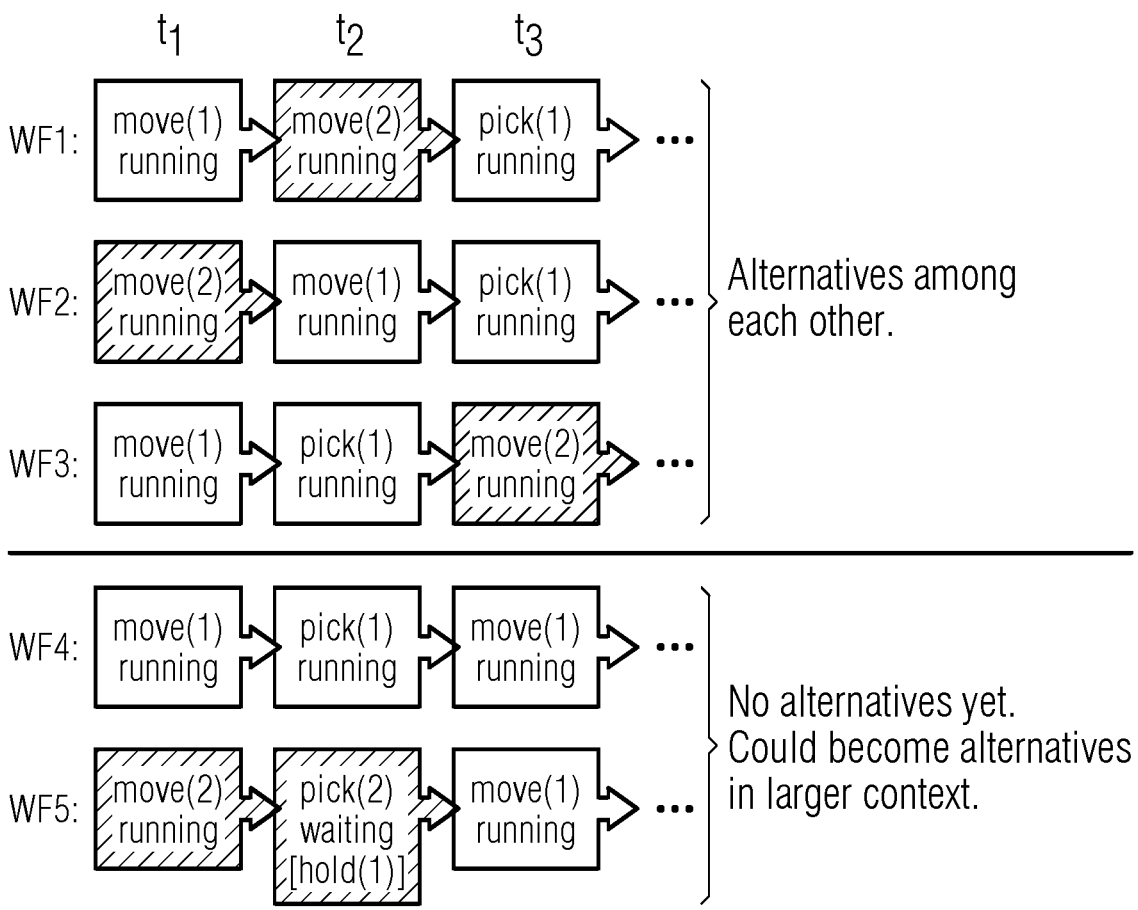
FIG. 10 illustrates workflow variants documented by different AHF ledgers.

FIG. 10 illustrates workflow variants documented in different AHF ledgers. Variant 1 is taken from the workflow WF illustrated in FIG. 6. Variant 4 is taken from the workflow WF illustrated in FIG. 7. Consequently, for example, in FIG. 10, the workflow parts 1 to 3 form alternatives to each other. Each of them possibly forms part of a larger alternative workflow WF for a comprehensive larger, comprehensive collaborative skill.

For comparison, the workflow variants 4, 5 also illustrated in FIG. 10 are not alternatives. However, in relation to a more comprehensive collaborative skill, all five workflows WFs illustrated in FIG. 10 can be part of alternatives to each other. All workflow WF variants illustrated in FIG. 10 can comprise different performance characteristics. Yet, all workflows WFs of the same, correct specification of a collaborative workflow WF can have the following properties (workflow properties WFP).

At any point in time, when selecting from an AHF ledger all AHF instances executed from collaborating machine M, the workflows WFs can be ordered by time exactly as in the specification of the skill for the respective collaborating machine M. Accordingly, there are consistent relations between automated handling functions AHFs within one workflow WF (WFP1).

The AHF ledger can contain a predecessor AHF S on collaborating machine N, i.e. AHF.S(N), sometime before AHF T on collaborating machine M conditioned with task S, i.e. AHF.T(M)[AHF.S(N)] (WFP2).

To prevent a standstill (e.g. caused by a deadlock), the specification of a collaborative workflow may comprise the following workflow property. If workflow WF(M) contains conditioned AHF.T(M)[AHF.S(N)], then WF(N) must not contain a conditioned automated handling function AHF.S(N)[AHF.T'(M)] where S depends on T' with T' being equal to T or T' following T, that is where T' lies in the future of T. Otherwise, AHF S and AHF T cannot complete and both workflows WF come to a halt. The workflows WFs on collaborating machine M and collaborating machine N would deadlock.

An example of a collaborative workflow specification which may violate this collaborative workflow property WFP is the following:

$$WF(M)=AHF.1(M)[AHF.1(N)] \quad \{11a\}$$

$$WF(N)=AHF.1(N)[AHF.1(M)] \quad \{11b\}$$

It can be derived that a workflow specific for collaborating machine M which is called workflow WF(M) has a property WFP1. In a collaboration scenario, at least one AHF.T(M) executed on collaborating machine M is conditioned with AHF.S(N) executed on the collaborating machine N. According to WFP2, AHF.S(N) must be executed sometime before AHF.T(M). That is, AHF.S(N) can occur in the common AHF ledger either one AHF before of AHF.T(M) or AHF.S(N) can occur in the common AHF ledger several AHFs before AHF.T(M).

Therefore, one can extend the derived workflow WF(M) and can insert the predecessor AHF(s) that must be executed on the collaborating machine N in order for the workflow WF on collaborating machine M to make progress. The workflow WF of only AHF.S$_i$(N) inserted in the workflow WF(M) has as well the property WFP1. Hence, we can derive from {11.a} of workflow WF(M) and extend workflow WF(M) with one predecessor AHF and obtain:

$$WF(M)=start(M)>>AHF.1(N)>>AHF.1(M)>>stop(M) \quad \{12a\}$$

If one derives from {11.b} a workflow WF of collaborating machine N and apply the same for a workflow WF on collaborating machine M, then one obtains:

$$WF(N)=start(N)>>AHF.1(M)>>AHF.1(N)>>stop(N) \quad \{12b\}$$

It is noted that the workflow states s have been dropped from workflows {12.a} and {12.b}. This can be done because the states of a workflow WF in the instants when the collaborative workflow processor CWP attempts to perform a transition from one AHF instance to the next AHF instance, that is whether a workflow can continue without a pause (state running, when an AHF ledger already contains a record for the predecessor AHFs) or has to wait for a conditioning AHF (state waiting, when a AHF ledger does not contain a record of the predecessor AHFs) is not relevant. Relevant to the analysis of a collaborative workflow WF for unwanted AHF dependency cycles are only the AHF dependencies.

With regard to workflow {12.a}, AHF.1(M) depends on the completion of AHF.1(N). With regard to workflow {12.b}, AHF.1(N) depends on the completion of AHF.1(M). Both machine-specific workflows {12.a} and {12.b} are correct on their own. However, both machine-specific workflows cannot be combined to a common, correct AHF ledger. If combined, these workflows WF may contradict each other insofar as a>>b and b>>a cannot hold at the same time. This also follows from the workflow properties WFP1 and WFP2 stated above which implies that the relation >> between instances of dependent automated handling functions AHFs is asymmetric, that is the following implication (=>) must hold:

For all AHF instances S and T of a consistent AHF ledger:

$$S>>T=>not(T>>S) \quad \{13\}$$

In other words, if AHF instance T executes after AHF instance S, then AHF instance S cannot execute after AHF instance T.

The following example may be considered: a stacking machine (here collaborating machine "1") shall first stack a number of objects, and a packing machine (here collaborating machine "2") shall thereafter pack the stacked objects. The objects here may e.g. be workpieces or tools. The workflow WF(2) for the packing machine may then be described as follows:

$$WF(2)=>>pack<object>(2)[stack<object>(1)]>> \quad \{14a\}$$

It would be clearly contradictive to require in addition that the packing machine first packs the objects and that the stacking machine stacks the objects thereafter in a workflow WF(1) of the stacking machine:

$$WF(1)=>>stack<object>(1)[pack<object>(2)]>> \quad \{14b\}$$

Hence, the collaborative workflow specification that matches the AHF pattern {11.a} and {11.b}, for example {14.a} and {14.b}, is incorrectly specified. This is rather obvious for this simple use case, where the same automated handling functions AHFs are conditioned automated handling functions AHFs and comprise predecessor automated handling functions AHFs for each other. More demanding are specifications of collaborative workflows WFs where other automated handling functions AHFs execute in between cyclically dependent automated handling functions AHFs as illustrated in the following example:

$$WF(M)=AHF.1(M)[AHF.2(N)]>>AHF.2(M) \quad \{15.a\}$$

$$WF(N)=AHF.1(N)>>AHF.2(N)[AHF.2(M)] \quad \{15.b\}$$

With this specification of a collaborative workflow WF, one can obtain the following machine-specific workflows WFs each extended with the necessary predecessor automated handling functions AHFs:

$$start(M)>>AHF.2(N)>>AHF.1(M)>>AHF.2(M)>>stop(M) \quad \{16.a\}$$

$$start(N)>>AHF.1(N)>>AHF.2(M)>>AHF.2(N)>>stop(M) \quad \{16.b\}$$

According to {16.a}, AHF.2(M) depends indirectly on AHF.2(N), because AHF.1(M) is executed in between. According to {16.b}, AHF.2(N) depends directly on AHF.2(M). Again, one has a cycle dependency between AHF instances. As above, if combined, these workflows WFs contradict each other insofar as a >> ... >> c and c>> ... >> a cannot hold at the same time.

This follows as well from the workflow property WFP1 which implies that the relation >> between AHF instances in workflows is transitive, that is, the following implication (=>) must hold:

For all AHF instances a, b and c of a consistent AHF ledger:

$$(a>>b) \text{ and } (b>>c)=>a>>c \quad \{17\}$$

The implication {17} can be applied once or more times on a workflow WF to eliminate intermediate AHF instance b$_i$ between indirectly dependent automated handling functions AHFs a and c:

$$a>>b1>>b2>> \ldots c \Rightarrow^* a>>c \quad \{18\}$$

Now, implication {13} must hold for the AHF instances of interest, that is, for AHF instances a and c.

AHF dependency cycles are not to be confused with AHF execution cycles. A production process can require that an automated handling function AHF is to be performed several times. A simple example is a workpiece that needs two boreholes at different places. Collaborating machine M1 deals with the workpiece and collaborating machine M2 deals with the machine tool (e.g. the machine drill). In this case, the workflow specification can distinguish instances of the same automated handling function AHF (drill). The formative automated handling functions AHFs of the collaborative workflow can be described as follows:

$$WF(1)=hold(1)>>place(1)[drill.2(2)]>> \quad \{19.a\}$$

In other words, collaborating machine M1 can only place the workpiece after collaborating machine M2 has drilled both boreholes.

$$WF(2)= \ldots move(2)[hold(1)]>>drill.1(2)>>move(2)$$
$$[hold(1)]>>drill.2(2)>>move(2)>> \ldots \quad \{19.b\}$$

Collaborating machine M2 xpects collaborating machine M1 to hold the workpiece in an unchanged position for drilling the boreholes at different places. Between both drilling operations, collaborating machine M2 moves the drill tool from one place to the other place.

Figure 11:
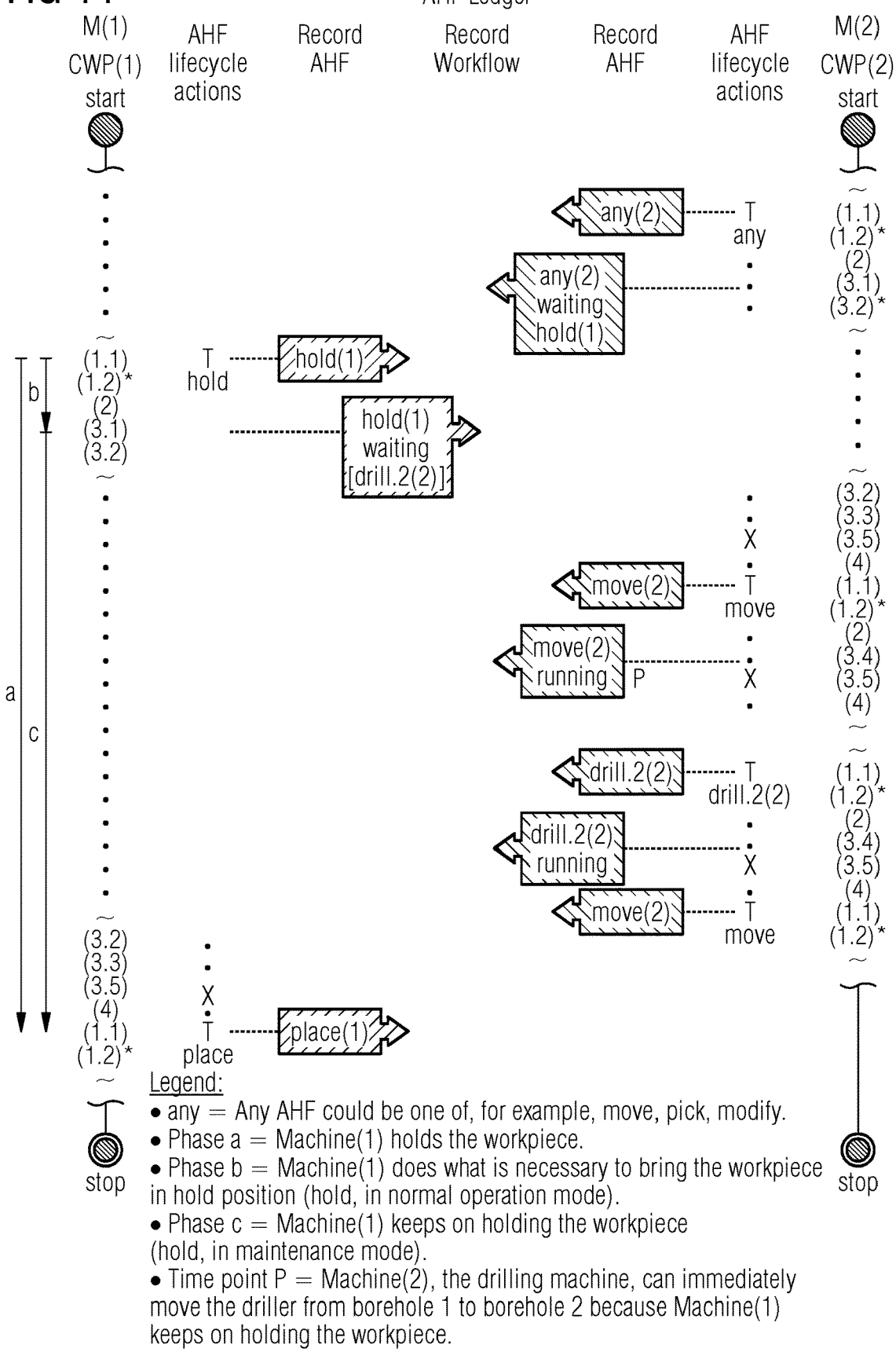
FIG. 11 illustrates the structure of a successful workflow performed by two collaborating machines and coordinated by a common AHF ledger.

FIG. 11 shows a basic structure of a successful workflow WF resulting from {19.a} and {19.b}. FIG. 11 illustrates the collaborative drilling. Collaborating machine M1 applies {19.a} on workpieces (for instance wooden blocks) and collaborating machine M2 applies {19.b} on tools (e.g. drills).

In a possible embodiment, the system according to the present invention provides an error handling procedure when executing a collaborative workflow.

The automation system AS according to embodiments of the present invention can comprise one or several collaborating machines M. If the automation system AS comprises only one machine, the machine may perform an autonomous workflow WF. The autonomous workflow WF is the workflow that executes autonomously on one machine M of the automation system AS without any human intervention.

In contrast, a collaborative workflow is a workflow WF that is executed on two or more collaborating machines M at the same time to enable an interaction between them. Each collaborating machine M of the automation system AS can comprise an associated workflow execution context WEC. The workflow execution context WEC comprises a common memory area which contains data items DI which are shared between automated handling functions AHFs executed on the same collaborating machine M.

Only the currently executing automated handling function AHF can access the workflow execution context WEC of the collaborating machine M. The automated handling function AHF forms part of a workflow WF. The automated handling function AHF can implement a production step conforming the predefined function as defined e.g. in VDI2860. An AHF instance comprises the execution of an automated handling function AHF on exactly one machine M. An AHF instance forms part of a workflow WF. An AHF ledger can comprise a database that keeps track of executed AHF instances in an immutable way, i.e. once a record is entered into the ledger it cannot be changed anymore. A workflow WF can comprise the execution of automated handling functions on one or more collaborating machines M. A control token CTOK flows through the AHF instances created from automated handling functions AHFs that belong to such a workflow WF.

The method and system for controlling a production process performed by collaborating machines M of an automation system AS according to the first and second aspect of embodiments of the present invention provides several advantages.

Collaborative machine workflows can be executed by collaborating machines M capable of interaction such as robots. Hence, it is possible to implement and execute workflows WFs that individual machines M cannot perform. This is of interest in the context of single-place assembly as opposed to assembly lines.

Further, the method and system according to embodiments of the present invention provide for a collaboration of two or more collaborating machines M on the level of individual automated handling functions AHFs or process steps of a process. The method and system allow specifying machine collaborations in a flexible and efficient way.

The method and system according to embodiments of the present invention further allow coordinating multiple collaborating machines M. The method according to embodiments of the present invention allows reducing the required communication needed for facilitating the collaboration of collaborating machines M with minimal coordination effort. Hence, the communication provided by the method and system according to embodiments of the present invention is simple, reliable, fast and resource-efficient.

Starting with a work plan for the complete collaborative workflow, the individual work plans or workflows WFs for each of the collaborating machines M of the automation system AS can be extracted for parallel execution and rendezvous when necessary. Each collaborating machine M can optimize on its own point of view the automated handling functions AHFs assigned to it with a minimal set of constraints. Further, the method and system according to embodiments of the present invention allow for local optimizations which can be performed on each collaborating machine M with regard to collaborating machine M and process characteristics which possibly are not known on the level of a central, overall work plan generator. On the level of an overall work plan for all collaborating machines M, the conditions specified within the workflow WF do allow for different workflows WFs. On this level, also an optimization is possible, for example with regard to the properties of the production process, e.g. quality, cost and time.

The collaborative workflows WFs provided by the method and system according to embodiments of the present invention allow the specification of conditions that must be observed. Automated handling functions AHFs can be ordered within a workflow on each collaborating machine M and also between collaborating machines M of the automation system AS. It can also be generated, for instance based on a priority graph.

The collaborative workflows WFs can be composed of fine-grained, modular automated handling functions AHFs focused on recurring production steps with a clear interface. Automated handling functions AHFs can be reused with different skills. Fine-grained automated handling functions AHFs allow for a modular composition of new workflows WFs by a reuse of existing automated handling functions AHFs. In contrast to this, conventional approaches depend on skills for each individual problem leading to a high number of complex skills with little possibility for reuse of existing solutions in a new context.

A coordination layer that is formed by the AHF ledger documenting the history of a process in an immutable way can be replicated on the collaborating machines M and hence be implemented in the exact same way so that the integrity of the AHF ledger is ensured. In a possible embodiment, an efficient factory-wide blockchain of AHF and workflow records can be implemented.

AHF ledgers can be additive and distributable. For instance, if an AHF ledger is owned by two interacting collaborating machines, the records can be transferred in a possible embodiment to a central, for instance factory-wide, AHF ledger where all workflows WF of all collaborating machines M are documented.

The method and system for controlling a production process performed by collaborating machines M of an automation system AS according to embodiments of the present invention increase the efficiency of the production process, in particular the production process can become faster and more flexible. For instance, different products can be produced in the production process with a small lot size in one shift. Faster production results in higher output within a given time period.

The method and system further provide for optimization of a given work plan or workflow WF on each collaborating machine M with regard to given quality attributes. Optimization of a given work plan or workflow WF on each collaborating machine M can be performed with the goal to minimize production times. Further, the method and system according to embodiments of the present invention allow to reuse automated handling functions AHFs which can be implemented by software components in different production processes and/or machine application scenarios.

A collaborative workflow processor CWP provides for robust interactions between automated handling functions AHFs on a single machine or between collaborating machines. Due to the coupling via AHF ledgers, collaborating machines M of the automation system AS can be of different designs and implementations and, hence, also from different manufacturers.

In a possible embodiment, the AHF ledger can be implemented based on blockchain technology. The AHF ledger does not only document the work progress but also does facilitate the coordination of automated handling functions AHFs executed on different collaborating machines M of the automation system AS that collaborate to produce a product. Therefore, the coordination of automated handling functions AHFs between collaborating machines M of the automation system AS perform fast, in tight real time with minimum overhead.

In a possible embodiment, the system does not only comprise a passive AHF ledger storing AHF records and workflow records but also comprise a service program that automatically publishes interesting events of the system, i.e. entries in the AHF ledger for which the collaborative workflow processors CWPs have subscribed. The collaborative workflow processor CWP on collaborating machine M can subscribe for automated handling functions AHFs that may be executed on different collaborating machines M and must have finished before the workflow WF on collaborating machine M can continue. The method and system according to the present invention can be used in any kind of cyber-physical production system CPPS.

The embodiments provide according to a further third aspect a method for dynamic adaption of a workflow WF on an automation system AS. The workflow WF comprises automated handling functions AHFs implementing associated production steps of a production process controlled by a workflow processor WP of a collaborating machine M of the automation system AS and at least one automated handling function AHF shell configured to plug a pluggable automated handling function pAHF into the workflow WF of the automation system AS during runtime of the automation system AS for adaption of the respective workflow WF.

The method for dynamic adaption of a workflow WF of an automation system according to the third aspect of embodiments of the present invention can be used to dynamically adapt the automation system AS by plugging new workflows and automated handling functions AHFs to perform functions that have not been foreseen at the time of programming of the automation system AS. New automated handling functions AHFs can therefore be provided at system start time of the automation system AS. Further, new skills and automated handling functions AHFs can be provided during system runtime.

New versions of existing automated handling functions AHFs can be used and plugged into the AHF shell. New versions of automated handling functions AHFs can possess different characteristics as the already available automated handling functions AHFs and can provide other operational behavior with regard to system metrics such as resource consumption, quality, efficiency or cost. New versions of automated handling functions AHFs can be better suited than those already existing and performed by the automation system AS.

As already described in context with FIG. 2, an automated handling function AHF can denote a defined function which can contribute to carry out a workflow WF. An automated handling function AHF executes its function when possessing the control token CTOK as shown in FIG. 2. During execution, an automated handling function AHF can read and write data items DI in the workflow execution context WEC. A workflow WF can be composed of a series of automated handling functions AHFs as shown in FIG. 3. A workflow WF can be specified as a machine- and human-readable expression comprising a series of automated handling functions AHFs.

$$WF(M)=AHF1>>AHF2>> \ldots >>AHF\ n \quad \{20\}$$

A workflow WF can denote a production workflow such as assembling a product from workpieces. Machine M of the automation system AS denotes the machine that executes the workflow WF. Automated handling functions AHF1, AHF2 denote automated handling functions AHFs to be formed by an entity such as an actuator of the collaborating machine M to accomplish the required production process. Typical automated handling functions AHFs are for example: move arm, pick drill and/or drill a hole. The symbol ">>" represents two ports connecting two consecutive automated handling functions AHFs, whereby the first arrow > indicates the output port of the previous AHF and the second arrow > indicates the input port of the next automated handling function AHF.

Figure 12:
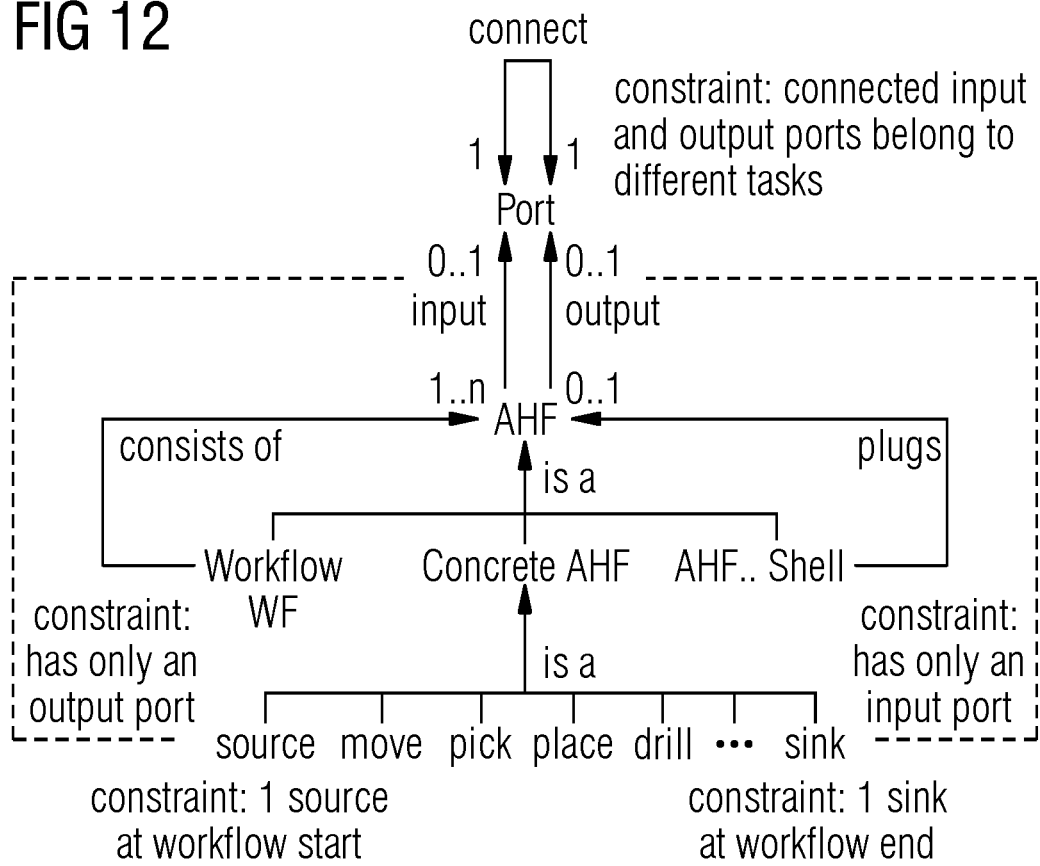
FIG. 12 illustrates a model for workflows of machine automated handling functions AHFs.

FIG. 12 shows an overview of workflows WFs consisting of several concrete automated handling functions, AHF shells or sub workflows. A workflow processor WP can instantiate workflows WFs. A workflow processor WP creates instances of either concrete AHFs or AHF shells according to a workflow specification. Automated handling functions AHFs of a workflow WF can share data organized in a common workflow execution context WEC as also illustrated in FIG. 3. The workflow processor WP executes a workflow WF and can comprise a series of automated handling functions AHF0 to AHFn as shown in FIG. 3.

A workflow processor WP uses control tokens CTOK to coordinate AHF executions. A workflow processor WP forwards control tokens CTOK from one automated handling function AHF (the previous one) to the next automated handling function AHF through the ports which connect consecutive automated handling functions AHFs. The source AHF forms a special concrete AHF with only one output port. The source AHF generates control tokens CTOK, the sink AHF and the special concrete AHF with only one input port as shown in FIG. 3. The sink AHF can destroy the received control tokens CTOK. A workflow WF can contain exactly one source AHF at the beginning and one sink AHF at its end. An AHF only executes upon receiving a control token CTOK through the input port connecting it to the previous AHF. After completing execution, an AHF forwards the control token CTOK through the output port which connects the AHF with the next AHF.

Figure 13:
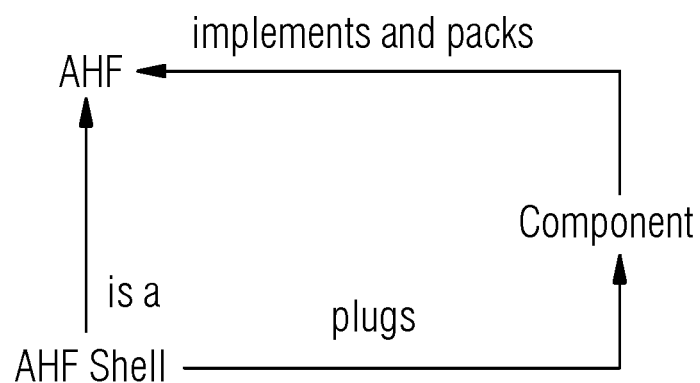
FIG. 13 illustrates an AHF shell used to plug pluggable software components.

FIG. 13 illustrates AHF shells used to plug pluggable software components. Components can pack task implementations in binary form. A component implementing an AHF is called a pluggable component. AHF shells can plug pluggable components, i.e. plugged-in automated handling functions pAHFs, at runtime into dynamically adaptable workflows WFs. Because being AHFs automated handling functions AHF shells can appear anywhere in a workflow WF where automated handling functions AHFs are provided.

For example, $$\text{WF=Source}> \ldots >\text{AHF}i-1>>\text{AHF Shell } i>>\text{AHF } i+1>> \ldots >\text{Sink AHF} \quad \{21.a\}$$

An alternative representation indicates the component/AHF to be plugged, for example:

$$\text{WF=Source}> \ldots >\text{AHF } i-1>>\text{AHF } i \text{ plug: AHF } j>>\text{AHF } i+1> \ldots >\text{Sink} \quad \{21.b\}$$

FIG. 14 illustrates an automated handling function AHF shell as part of a workflow WF.

An automated handling function AHF shell can implement the AHF interface. Interface is meant in the sense of an interface program construct provided by object-oriented programming languages. An AHF interface can consist of two parts as illustrated in FIG. 15. The AHF interface comprises a task control for receiving and releasing control tokens CTOK as well as task data for reading and writing data in the workflow execution context WEC.

The task control is used to start AHF executions, where an automated handling function AHF receives the control token CTOK via a real or virtual input port, and to stop AHF executions, i.e. an AHF releases the control token CTOK via a real or virtual output port. Essentially, task data is used for providing an automated handling function AHF read and write access to the workflow execution context WEC that related workflow automated handling functions AHFs share.

A pluggable automated handling function pAHF can implement at least one associated production step of a production process performed by at least one collaborating machine M of the automation system AS. A workflow WF controlled by the workflow processor WP of the collaborating machine M of the automation system AS forms part of a workflow execution context WEC associated with the machine M and stored in the local memory of the collaborating machine M. The workflow execution context WEC contains data items DI shared between automated handling functions AHFs executed by entities, in particular actuators, of the collaborating machine M as also illustrated in FIGS. 2, 3.

As soon as the pluggable automated handling function pAHF has been plugged into the automated handling function AHF shell of the workflow WF, a control token CTOK is passed by the automated handling function AHF shell into the pluggable automated handling function pAHF to execute the pluggable automated handling function pAHF as also illustrated in FIG. 14.

The pluggable automated handling function pAHF can be loaded in a possible embodiment from a repository stored in a database of the automation system AS. In a further possible embodiment, the pluggable automated handling function pAHF can be read from a local memory of the collaborating machine M of the automation system AS. In a still further possible embodiment, the pluggable automated handling function pAHF can be read from a portable data carrier connected to the collaborating machine M of the automation system AS. In a still further possible embodiment, the pluggable automated handling function pAHF can be provided by a software component delivery pipeline or by an automated update service of the system.

In a possible embodiment, the pluggable automated handling function pAHF can be indicated in a specific data item stored in the workflow execution context WEC of the collaborating machine M. The pluggable automated handling function pAHF can be adapted to perform a specific automated handling function AHF and/or a specific error handling function. In case that a required pluggable automated handling function pAHF indicated in the data item DI is not available, the automated handling function AHF shell can provide in a possible embodiment a default behavior and can indicate the unavailability of the required pluggable automated handling function pAHF.

A control token CTOK can be used for controlling the workflow WF execution and can also be used for controlling the application of an error handling policy if an error occurs during execution of an automated handling function AHF, in particular during execution of the pluggable automated handling function pAHF.

FIG. 16 describes the semantics of task control and task data of automated handling function AHF shells in form of a programming language in pseudo code.

Figure 17:
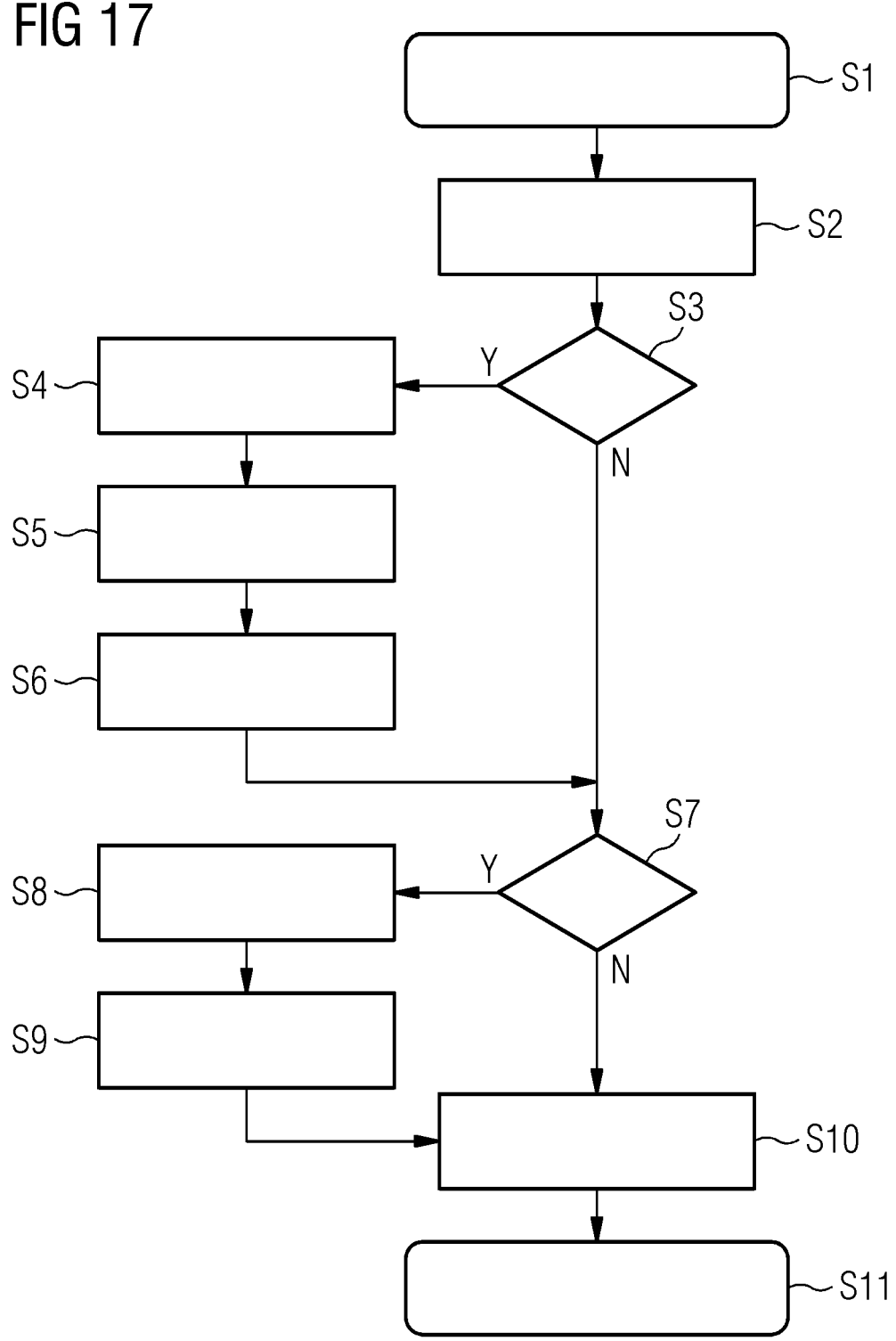
FIG. 17 illustrates the AHF shell semantics shown in FIG. 16 as a flowchart.

FIG. 17 represents the pseudo code of FIG. 16 in a flowchart.

FIG. 17 shows the automated handling function AHF shell semantics as a flowchart. It can be seen if a control token CTOK is available on the input port of the automated handling function AHF shell (step S1), the automated handling function AHF execution is started (step S2). In step S3, it is checked whether there is a pluggable automated handling function pAHF. If this is the case, a previously plugged-in software component is unplugged in step S4. The new pluggable automated handling function pAHF is plugged in step S5 into the AHF shell, for instance if it is available in the software component repository of the system. In step S6, a new component access to the workflow execution context WEC is provided. In step S7, it is checked whether the software component has been successfully plugged into the AHF shell. If this is the case, the control token CTOK is passed to the plugged pluggable automated handling function pAHF in step S8. In step S9, the control token CTOK from the plugged software component, i.e. pluggable automated handling function pAHF, is received. This stops the AHF shell execution in step S10. In step S11, the control token CTOK is available on the output port of the AHF shell and can be passed to the next automated handling function AHF of the workflow WF.

The automated handling function AHF shell can be used to plug a pluggable software component, in particular a pluggable automated handling function pAHF, after unplugging a potentially already plugged-in software component. The AHF shell sets the workflow execution context WEC of the plugged-in software component and can indicate that the software component, i.e. the pluggable automated handling function pAHF has been plugged into the AHF shell. The AHF shell passes the control token CTOK to the plugged-in software component and may forward the control token CTOK to the next AHF if no software component is plugged.

The AHF shell acts as a source AHF and as a sink AHF for the plugged-in automated handling function pAHF.

The AHF shell can carry out automated handling functions AHFs from a workflow processor WP for the plugged automated handling function pAHF. Plugging machine tasks packed in pluggable software components can be implemented by loading plugged-in automated handling functions pAHFs from a library or repository dynamically.

Figure 18:
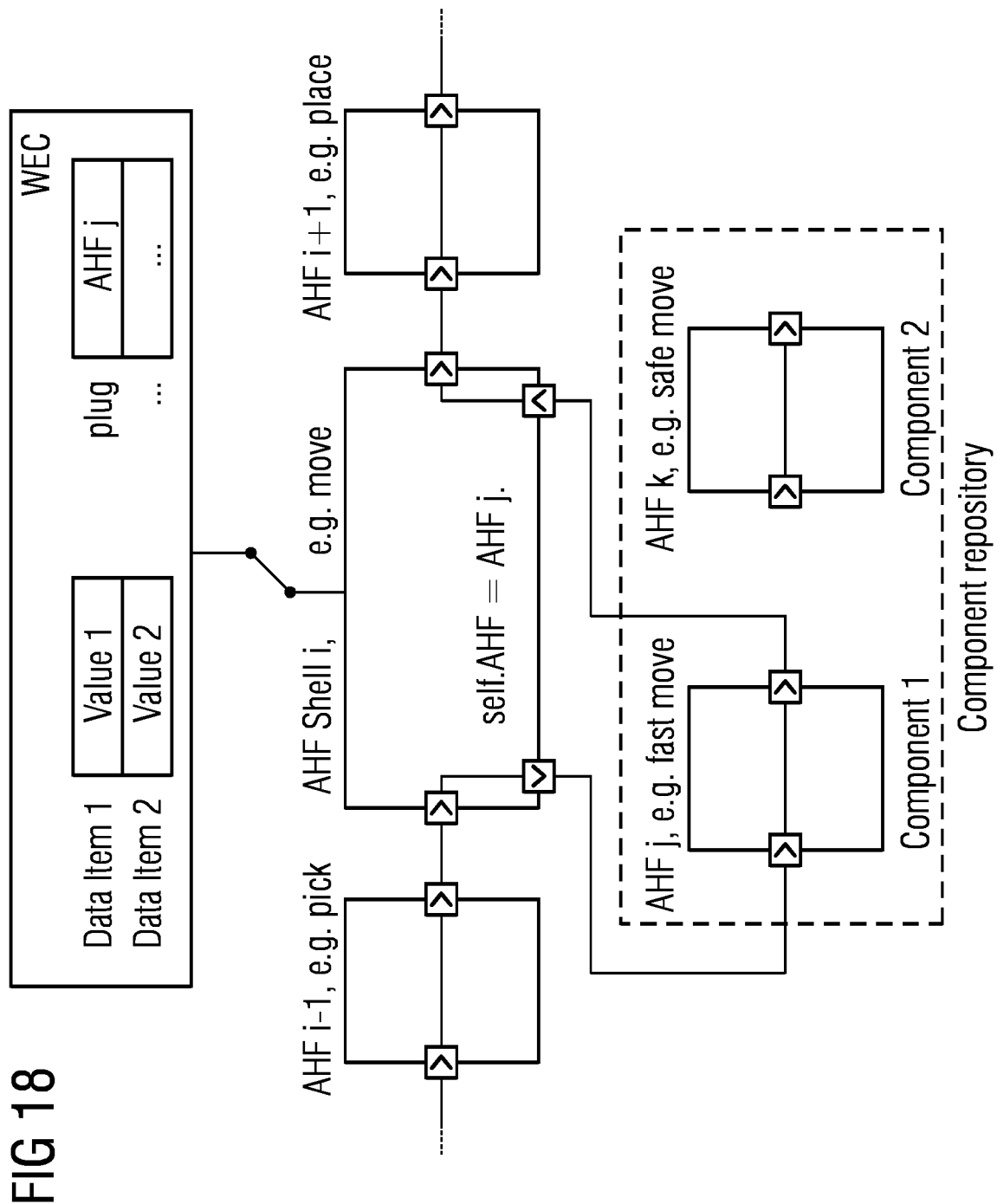
FIG. 18 illustrates the AHF shell plugging an AHF packed in a component loaded from a component repository.

FIG. 18 illustrates the plug-in of a concrete automated handling function (fast arm move) in an AHF shell (arm move) as part of a workflow WF. As an example, the following workflow (section) for a component/task is plugged:

$$WF= \ldots >>\text{gripper pick}>>\text{arm move plug;fast arm move}>>\text{gripper place}>> \quad \{22.a\}$$

The same exemplary workflow after a component or automated handling function AHF has been plugged into the shell:

$$WF= \ldots >>\text{gripper pick}>>\text{fast arm move}>>\text{gripper place}>> \quad \{22.b\}$$

An AHF shell specific entry in the workflow execution context WEC can indicate whether and which AHF/software component a AHF shell shall plug. Depending on the machine context of the collaborating machine M and the production plan, the AHF shell can plug a different automated handling function pAHF, e.g. a safe but slow arm move.

In a possible embodiment, the AHF shell can search for the software component to be plugged in, e.g. the pluggable automated handling function pAHF in a software component repository of the system. In a possible embodiment, the collaborating machine M can comprise a local memory for storing a software component repository. Alternatively, or additionally, the software component repository including the plurality of different pluggable automated handling functions pAHFs can be provided remotely, for example, by a factory-wide component repository or in a cloud as a kind of marketplace of machine automated handling functions AHFs.

In a possible embodiment, the workflow processor WP can read a workflow specification from the workflow execution context WEC. The workflow processor WP instantiates concrete automated handling functions AHFs and/or AHF shells as described in the workflow specification.

Then, the workflow processor WP connects the input ports and output ports of the respective automated handling functions AHFs and AHF shells such that all automated handling functions AHFs and AHF shells are connected in a sequence with a control token source AHF at the beginning of the workflow WF and a control token sink AHF at the end.

For each AHF shell, the workflow processor WP writes the name of the automated handling function AHF/software component to be plugged in a AHF shell specific entry in the workflow execution context WEC.

During AHF shell execution, i.e. when the AHF shell owns the control token CTOK, the pluggable software component, i.e. the pluggable automated handling function pAHF corresponding to the name of the AHF is looked up in the software component repository. The software component repository can be for example a file directory of the machine M executing the workflow WF or a kind of remote application store. The AHF shell loads the automated handling function, i.e. the pluggable automated handling function pAHF, dynamically, i.e. it plugs the automated handling function AHF or pluggable software component at the workflow/AHF runtime.

Once plugged, the software component, i.e. the pluggable automated handling function pAHF, can provide a task functionality which is executed every time when the automated handling function AHF shell receives the control token CTOK on its input port and passes the control token CTOK to the plugged-in automated handling function pAHF.

At any time during execution, the workflow specification stored in the workflow execution context WEC can be dynamically adapted by an external machine controller MC. The external machine controller MC can comprise in a possible implementation a software component pipeline. The external machine controller MC can read, write and replace workflow specifications contained in the workflow execution context WEC. In a possible embodiment, during execution, the workflow processor WP can check for updated workflow specifications at the beginning of each workflow execution cycle, i.e. right before the source AHF produces a control token CTOK. A new workflow specification may change the number of automated handling functions AHFs and AHF shells being instantiated and/or the names of pluggable software components that AHF shells shall plug.

The machine controller MC can also deploy new or alternative, pluggable components from the component repository. Switching to another version or variant of a pluggable component, i.e. pluggable automated handling function pAHF, can be achieved by rewriting the workflow specification such that, for example, version 2 of a pluggable component or a pluggable AHF is required instead of version 1 of the same pluggable component. An example of a workflow WF that requires version 2 of fast arm move is given as follows:

$$WF= \ldots >>\text{gripper pick}>>\text{arm move plug: fast arm move 2}>>\text{gripper place}>> \quad \{23\}$$

Name suffixes like 2 at the end of "fast arm move 2" do denote versions of a pluggable automated handling function pAHF.

If a workflow specification requires version 2 of the pluggable automated handling function pAHF but the software component repository does only contain version 1 of this pluggable automated handling function pAHF, the responsible AHF shell plugs can depend on one or more parameters. These parameters can comprise component/AHF compatibility strategy, the machine/production state or history as well as the machine environment.

In a possible embodiment, the pluggable automated handling function pAHF can be used for error handling. A control token CTOK that flows through a workflow WF between automated handling functions AHFs can indicate errors that possibly have occurred during the execution of a particular automated handling function AHF and/or a policy to be applied if an error occurs during execution of a particular automated handling function AHF.

Error handling with control tokens CTOK can be specified as follows:

$$\text{Control token: } \{\text{on error: AHF Number}\} \quad \{24\}$$

Thereby, AHF denotes an automated handling function AHF to be performed on a machine M optionally including a version number, e.g. "fast arm move" or "fast arm move 3". The number is optionally given in form of a positive or negative version number denoting a range of alternative versions of the responsible versions the responsible AHF shell shall try during error handling, if necessary and if possible.

For example, assuming that "fast arm move 3" (version 3) has failed, the error handling policy can read as follows:

$$\text{on error: } +1 \quad \{25\}$$

In this case, the AHF shell looks for plugs "fast arm move 4" (version 4 results from 3+1) and retries AHF execution using "fast arm move 4". If the component repository does not contain the component in version 4, then the workflow execution is aborted.

For another example, it can be assumed that "fast arm move 3" (version 3) has failed and the error handling policy reads as follows:

on error: +2  {26}

Further, it can be assumed that the component repository contains both software components or pluggable automated handling functions pAHFs "fast arm move 4" (version 4 results from 3+1) and "fast arm move 5" (version 5 results from 4+2). In this case, the responsible automated handling function AHF shell plugs and tries the pluggable automated handling function pAHF in version 4 and afterwards, if the pluggable automated handling function pAHF version 4 fails as well, plugs and tries the pluggable automated handling function pAHF in version 5.

The error handling policy can require a different automated handling function AHF:

on error: safe arm move 2+1  {27}

In this case on error, the responsible AHF shell replaces (i.e. plugs and tries) "fast arm move" with "safe arm move" from a version/variant 2. If this fails as well version/variant 3 the AHF shell tries version/variant 3 of "safe arm move".

Error handling policies can be specified in workflow specifications, for example:

WF= . . . >>gripper pick>>arm move plug: fast arm move 2 on error: safe arm move>>  {28}

The external machine controller MC of the automation system AS can update a workflow specification in order to replace a concrete automated handling function AHF with another concrete automated handling function AHF, for example for sake of improving the performance of an automated handling function AHF or for optimizing the performance of a workflow WF. For example, an automated handling function AHF "arm move" of a robot can be provided. The automated handling function AHF "flexible arm move" provides an automated path planning function for a robotic arm of a machine M with several degrees of freedom.

The automated handling function AHF "efficient arm move" can improve the path planning functionality. The automated handling function AHF "efficient arm move" may reduce the number of path segments, possibly the lengths of paths, and may save energy and/or machine wear. Since path plan algorithms can be continuously improved, robots in production can be updated seamlessly without downtimes to benefit from newer versions of the automated path planning algorithm.

Using an automated path planning example provided by a pluggable software component "flexible arm move" (FAM), an error handling policy can require a path planner implemented by the software component "safe arm move" (SAM). It may happen that FAM computes a path which leads to a collision of the robotic arm with a physical object, i.e. an obstacle that stands in the way since recently. Path plans may lead to collisions if, for example, the waypoints of the computed path are too far apart and narrow objects finding themselves between two waypoints along the path are being erroneously ignored by the path plan. In this case, another algorithm or another version of the same algorithm or automated handling function AHF can be tailored to produce paths with waypoints closer to one another at the expense of slower planning. The need for such tradeoffs cannot always be foreseen by programmers since factory layouts, production machines M and products can have different physical properties or change from one instance to another. Such situations profit from dynamic runtime adaptions of automation software in production using the method for dynamic adaption of a workflow in an automation system AS according to the third aspect of embodiments of the present invention.

The method for dynamic adaption of workflow WF in an automation system AS can also be used in an automation system AS comprising collaborating machines M.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A method for dynamic adaption of a workflow, WF, of an automation system, AS, wherein the workflow, WF, comprises automated handling functions, AHFs, implementing associated production steps of a production process controlled by a workflow processor, WP, of at least one machine of the automation system, AS, and at least one automated handling function, AHF, configuring a shell to plug a pluggable automated handling function, pAHF, into the workflow, WF, of the automation system, AS, during runtime of the automation system, AS, for adaption of the workflow, WF, wherein collaborating machines M of the automation system, AS, perform the automated handling functions, AHFs, the method comprising:

coordinating the automated handling functions, AHFs, performed by the collaborating machines, M, of the automation system, AS, by means of a ledger, wherein the ledger is a shared database of the automation system, AS, storing metadata about the automated handling function, AHF, instances having been executed by the collaborating machines, M, and workflow states, S, of the collaborating machines, M, of the automation system, AS, wherein the workflow, WF, controlled by the workflow processor, WP, of the at least one machine of the automation system, AS, forms part of a workflow execution context, WEC, associated with the at least one machine and stored in a memory of the at least one machine, wherein the workflow execution context, WEC, of the at least one machine contains data items shared between automated handling functions, AHFs, executed by the at least one machine of the automation system, AS, and wherein the automated handling functions, AHFs, can use the workflow execution context, WEC, for storing workflow-internal data items shared by and/or flowing between automated handling functions, AHFs, of a same workflow.

2. The method according to claim 1, wherein the plugged-in automated handling function, pAHF, implements at least one associated production step of the production process performed by the at least one machine of the automation system.

3. The method according to claim 2, wherein as soon as the pluggable automated handling function, pAHF, has been plugged into the automated handling function, AHF, shell of the workflow, WF, a control token is passed by the automated handling function, AHF, shell into the plug-in automated handling function, pAHF, to execute the plug-in automated handling function, pAHF.

4. The method according to claim 1, wherein the plug-in automated handling function, pAHF, is loaded from a repository stored in a database of the automation system or read from a local memory of the machine of the automation system or read from a portable data carrier connected to the machine of the automation system or provided by a software component delivery pipeline or by an automated update service.

5. The method according to claim 1, wherein the plug-in automated handling function, pAHF, is indicated in a specific data item stored in the workflow execution context of the machine of the automation system.

6. The method according to claim 1, wherein the plug-in automated handling function, pAHF, is adapted to perform at least one of a specific automated handling function and a specific error handling function.

7. The method according to claim 5, wherein if a required plug-in automated handling function, pAHF, indicated in the data item is not available the automated handling function, AHF, shell provides at least one of a default behavior and indicates unavailability of the required plug-in automated handling function, pAHF.

8. The method according to claim 1, wherein each automated handling function, AHF, of the workflow, WF, comprises at least one input port and at least one output port to send and receive a control token between the automated handling functions, AHFs.

9. The method according to claim 8, wherein the execution of an automated handling function, AHF, is started automatically in response to reception of the control token via one of its input ports.

10. The method according to claim 8, wherein after completed execution of an automated handling function, AHFs, the control token passes via the output port of the automated handling function, AHF, to an input port of the next automated handling function, AHF, within the workflow, WF, to be executed.

11. The method according to claim 8, wherein the control token is used for controlling at least one of the workflow, WF, execution and the application of an error handling policy if an error occurs during execution of an automated handling function, AHF.

12. An automation system, AS, comprising at least one machine to perform a production process according to a workflow, WF, comprising automated handling functions, AHFs, implementing associated production steps of the production process and executed by a workflow processor, WP, of the machine, wherein the workflow, WF, comprises at least one automated handling function, AHF, shell configured to plug a pluggable automated handling function, pAHF, into the workflow, WF, of the automation system, AS, during runtime of the automation system, AS, to adapt dynamically the workflow, WF, of the automation system, AS, wherein the automated handling functions, AHFs, are performed by collaborating machines, M, of the automation system, AS, wherein the automated handling functions, AHFs, performed by the collaborating machines, M, of the automation system, AS, are coordinated by means of a ledger realized by a shared database of the automation system, AS, storing metadata about the automated handling function, AHF, instances having been executed by the collaborating machines, M, and workflow states, S, of the collaborating machines, M, of the automation system, AS, wherein the workflow, WF, controlled by the workflow processor, WP, of the at least one machine of the automation system, AS, forms part of a workflow execution context, WEC, associated with the at least one machine and stored in a memory of the at least one machine, wherein the workflow execution context, WEC, of the at least one machine contains data items shared between automated handling functions, AHFs, executed by the at least one machine of the automation system, AS, and wherein the automated handling functions, AHFs, can use the workflow execution context, WEC, for storing workflow-internal data items shared by and/or flowing between automated handling functions, AHFs, of a same workflow.

* * * * *